United States Patent
Sheng et al.

(10) Patent No.: US 11,166,076 B2
(45) Date of Patent: Nov. 2, 2021

(54) INTELLIGENT VIEWER SENTIMENT PREDICTOR FOR DIGITAL MEDIA CONTENT STREAMS

(71) Applicant: BROADBANDTV, Corp., Vancouver (CA)

(72) Inventors: Jiaqi Sheng, Richmond (CA); Mehrdad Fatourechi, Vancouver (CA); Di Xu, Richmond (CA)

(73) Assignee: BROADBANDTV, CORP., Vancouver (CA)

( * ) Notice: Subject to any disclaimer, the term of this patent is extended or adjusted under 35 U.S.C. 154(b) by 21 days.

(21) Appl. No.: 16/411,972

(22) Filed: May 14, 2019

(65) Prior Publication Data
US 2019/0356956 A1 Nov. 21, 2019

Related U.S. Application Data

(60) Provisional application No. 62/671,676, filed on May 15, 2018.

(51) Int. Cl.
*H04N 21/45* (2011.01)
*H04N 21/466* (2011.01)
*G06N 20/00* (2019.01)
*G06Q 30/02* (2012.01)
*H04N 21/258* (2011.01)
*H04N 21/25* (2011.01)

(52) U.S. Cl.
CPC ......... *H04N 21/4667* (2013.01); *G06N 20/00* (2019.01); *G06Q 30/0271* (2013.01); *H04N 21/251* (2013.01); *H04N 21/25883* (2013.01); *H04N 21/25891* (2013.01); *H04N 21/4532* (2013.01); *H04N 21/4665* (2013.01)

(58) Field of Classification Search
None
See application file for complete search history.

(56) References Cited

U.S. PATENT DOCUMENTS

| | | | |
|---|---|---|---|
| 8,166,032 B2 | 4/2012 | Sommer et al. | |
| 9,020,956 B1 | 4/2015 | Barr et al. | |
| 9,189,797 B2 | 11/2015 | Ghosh et al. | |
| 9,288,274 B2 | 3/2016 | Felt | |
| 9,852,239 B2 | 12/2017 | Natarajan et al. | |
| 9,967,628 B2 | 5/2018 | Jaini et al. | |
| 9,978,362 B2 | 5/2018 | Dolan et al. | |
| 10,341,278 B2 * | 7/2019 | Hawkins | H04L 51/32 |
| 2003/0101449 A1 * | 5/2003 | Bentolila | G06Q 30/0255 725/10 |
| 2007/0136753 A1 * | 6/2007 | Bovenschulte | H04N 21/41407 725/46 |
| 2010/0287588 A1 * | 11/2010 | Cox | H04N 21/26283 725/40 |
| 2015/0312604 A1 * | 10/2015 | Hoctor | H04N 21/2668 725/14 |

(Continued)

*Primary Examiner* — Cai Y Chen
(74) *Attorney, Agent, or Firm* — Holzer Patel Drennan

(57) ABSTRACT

The herein disclosed technology provides methods and systems for intelligently predicting viewer sentiments invoked by a collection of digital content (e.g., a web-based digital channel) based on an assessment of channel metadata, such as channel metadata defining an association between the channel and one or more other channels; channel history data for the channel; and demographic information about the channel.

20 Claims, 12 Drawing Sheets

(56) References Cited

U.S. PATENT DOCUMENTS

| | | |
|---|---|---|
| 2016/0086230 A1 | 3/2016 | French et al. |
| 2016/0364652 A1 | 12/2016 | Fei et al. |
| 2017/0212664 A1 | 7/2017 | Ghadiyali et al. |
| 2017/0249389 A1 | 8/2017 | Brovinsky et al. |
| 2018/0041458 A1 | 2/2018 | Hawkins |
| 2018/0089715 A1 | 3/2018 | Ken-Dror |
| 2018/0113863 A1 | 4/2018 | Kuznetsov |
| 2018/0152402 A1 | 5/2018 | Tsou |

* cited by examiner

INTELLIGENT VIEWER SENTIMENT PREDICTOR FOR DIGITAL MEDIA CONTENT STREAMS

PRIORITY

The present application claims priority to U.S. provisional patent application 62/671,676, entitled "Intelligent Viewer Sentiment Predictor for Digital Media Content Streams," and filed on May 15, 2018, which is hereby incorporated by reference for all that it discloses or teaches.

BACKGROUND

Online digital media reaches tens of millions of users every day. Various channels or accounts that provide collections of digital media content (e.g., videos, audio clips or imagery) can serve as highly effective venues for delivering messages as well as promoting products and services to large audiences. Promotors, such as advertisers and brand ambassadors, may have a difficult time selecting particular digital media channels or accounts to partner with in broadcasting their promotional content (e.g., advertising, public service messages). This particularly becomes an issue since some digital content channels or accounts may be managed by users that self-select content and are unregulated except for limited content moderation actions of digital platforms that are hosting the content, such as actions that retroactively take-down content responsive to user complaints.

Although different promoters may have different target audiences and message objectives, a common goal of such individuals is to select promotional channels that are likely to invoke positive user sentiments and/or unlikely to cause emotional controversy. For example, an advertiser may not want to include a commercial on a channel or account that offends or upsets a large group of people—such as a channel or account that advocates extremist views or broadcasts racially-offensive content. Without properly monitoring a particular channel for an extended period of time, a promoter may be ill-equipped to select a channel with content that is "safe" (e.g., unlikely to invoke unfavorable viewer sentiments), particularly since the content played on any given channel may change over time.

SUMMARY

Embodiments disclosed herein provide systems and methods for utilizing channel metadata and machine analysis of channel content to predict viewer sentiments invoked by a collection of digital content items. In accordance with one implementation, a method comprises assessing channel metadata associated with the collection of digital content items; determining a channel risk metric for the digital content channel based on the assessment of the channel metadata; and rendering to a display a sentiment prediction based on the channel risk metric. The channel metadata includes at least one of: data defining an association between the channel and one or more other channels; channel history data for the channel; and demographic information about the channel.

BRIEF DESCRIPTION OF THE DRAWINGS

A further understanding of the nature and advantages of the present technology may be realized by reference to the figures, which are described in the remaining portion of the specification.

FIG. 10 illustrates example outputs of another example sentiment prediction engine.

FIG. 11 illustrates example sentiment prediction metrics for different digital media content channels.

DETAILED DESCRIPTION

Figure 1:
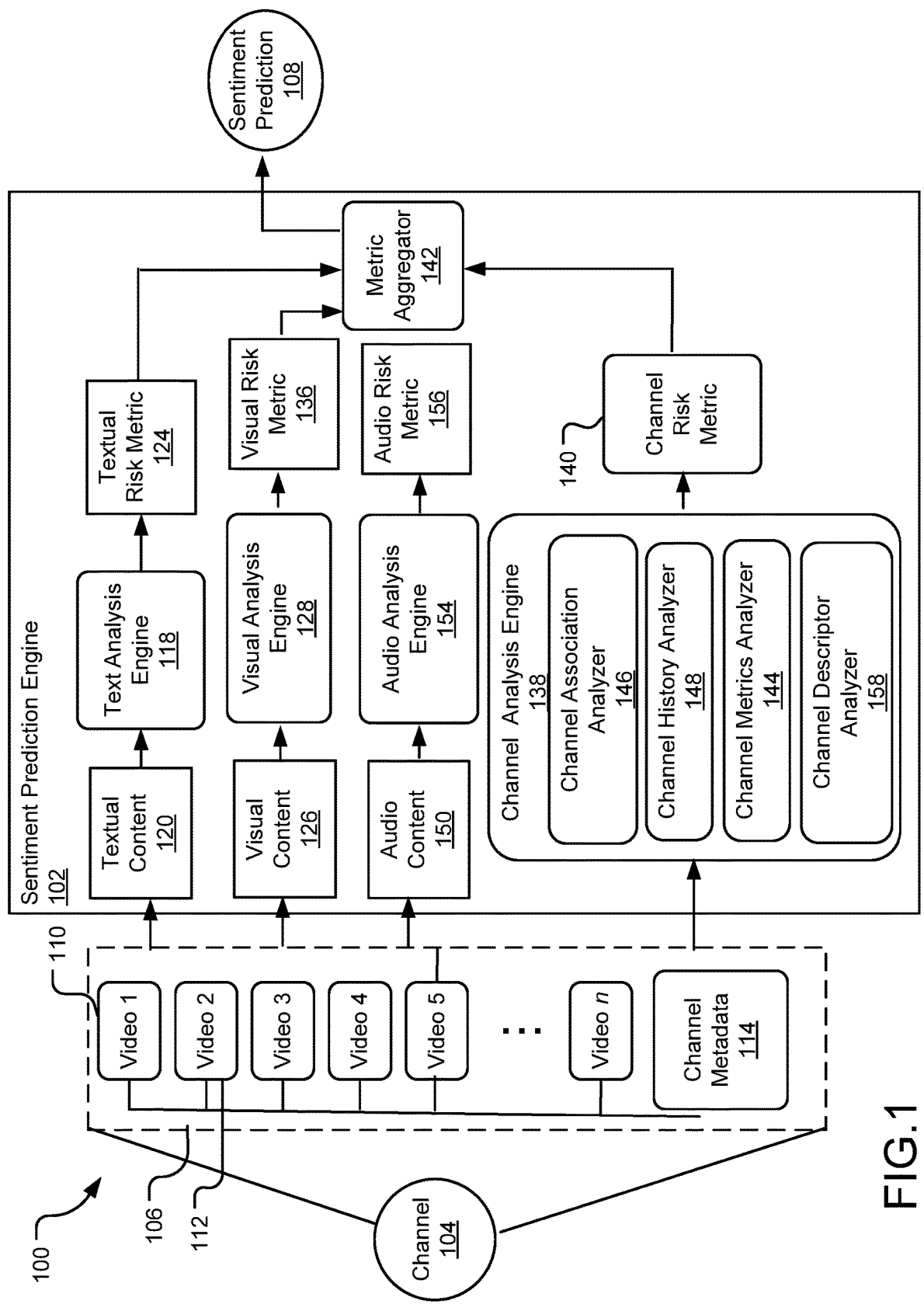
FIG. 1 illustrates an example system for predicting viewer sentiments associated with a collection of digital media content items available through a web-based channel.

Digital media hosting platforms that support channels for sharing user-uploaded content may strive to identify and flag user-uploaded content that is likely to invoke negative viewer sentiments. For example, digital platforms such as YouTube, Instagram, Facebook, Amazon, etc. may implement different processes for continuously monitoring and vetting user-uploaded content. This can be done in various ways. Some processes depend on algorithmic detection of obscene videos, images, audio and text; others depend upon user submissions and feedback to flag content for manual review by an employee of the digital platform. As the quantity of web-based user-uploaded content grows exponentially, these methods become more difficult to utilize effectively—either due to increased need for manpower (human review of content) or processing power to scan enormous volumes of content.

The herein disclosed technologies provide tools that intelligently forecast sentiments likely to be invoked by a digital content stream based on a variety of factors, including factors derived from metadata for a channel through which the content stream is accessed. These techniques may allow content promotors to more intelligently select the channel(s) with which they choose to associate their content and, in some applications, may allow content creators (e.g., channel managers) to evaluate the sentiments invoked by content available on their own digital media platforms, such as to allow these individuals to examine the suitability of content on their platforms for a particular target audience.

In the following disclosure, the terms "digital content stream," "digital channel," and "channel" are used to refer to a collection of digital media content items viewable from a same web domain, either in series or simultaneously. In one implementation, a digital channel refers to a user-managed URL used for sharing videos, images, audio (including music), text, or other content that is associated with a user account on a social media website. For example, one popular existing channel on YouTube.com with the "SaturdayNightLive" channel accessible through the URL https://www.youtube.com/user/SaturdayNightLive. This channel makes certain video content available for public viewing through the YouTube domain.

In addition to YouTube.com, there exist a variety of other social media websites that allow users to create accounts and to share uploaded videos and other content through a channel associated with that account. Thus, the term "channel" may also be understood as referring to a URL associated with a user account on social media website.

The herein disclosed technology facilitates an objective evaluation of user sentiment likely to be associated with a collection of digital content items available through a web-based channel. In one implementation, predictive tools disclosed herein evaluate individual digital channels with respect to one or more predefined risk categories. For example, the predictive tools may be utilized to determine that a particular channel has a strong or weak association one or more predefined risk categories including without limitation categories such as nudity, gore, profanity, violence, racially divisive content, politically-charged content, etc. Determining this type of association between an individual web-based channel and one or more risk categories may provide several benefits, such as allowing a content promotor to more objectively determine whether the web-based channel is good medium for broadcasting promotional content (e.g., a message, brand, service, product).

The following description includes several examples that reference videos viewable from a channel (e.g., videos 1-n in FIG. 1), to exemplify how the disclosed technology can be applied to a particular type of digital media. Here, videos are used by example and without limitation and it should be understood that the same technology can be extended to evaluate viewer sentiments for other forms other types of digital content, such as images (e.g., on Instagram), text (e.g., blog posts), music (e.g., Spotify), etc.

FIG. 1 illustrates an example system 100 for predicting viewer sentiments associated with a collection of digital media content items (e.g., a digital channel). The system 100 includes a sentiment prediction engine 102 that evaluates various inputs in association with a digital channel 104 to render a sentiment prediction 108. In general, the sentiment prediction 108 may be regarded as a quantification of emotional influence that the digital channel 104 has on a viewer or on a group of viewers. In many cases, the sentiment prediction 108 is indicative of the safety risk of a particular digital channel, or a risk that viewers' perception of promotional content (brands, products, messages) may be unfavorably affected due to the association of the promotional content with the channel 104.

In some implementations, the sentiment prediction 108 may quantify a degree of "negative sentiment risk," which generally refers to risk that viewers will experience negative or strongly polarized sentiments when viewing the content of the digital channel 104. For example, a sentiment prediction engine 102 may determine that the digital channel 104 poses a high probability of negative sentiment risk when the digital channel broadcasts content that satisfies certain "high-risk criteria," such as if the digital channel 104 broadcasts content that is likely to offend or upset viewers or be unsuitable for advertisers—such as content that is racially or culturally derogatory, misogynistic, politically extremist, profane, offensive, unfit for a certain audience (e.g., children), etc. In other implementations, the sentiment prediction engine 102 may evaluate a probability of a user experiencing negative sentiment when viewing channel content as a result of the channel including content that a user is likely to characterize in association with a predefined risk category, such as profanity, nudity, drug and narcotics use, sexuality, violence, horror, gore, etc. In still other implementations, the sentiment prediction 108 may evaluate a probability that a viewer of channel content may experience positive sentiments—e.g., view the content favorably without experiencing negative feelings such as offense, dislike, disapproval, disgust, etc.

The sentiment prediction engine 102 evaluates channel inputs 106, which may take on a variety of different forms depending on the nature of the digital channel 104. In the illustrated implementation, the channel inputs 106 include a collection of digital content items (e.g., content items 110, 112) broadcast by the digital channel 104. The content items 110, 112 are shown to be videos but may in some implementations may be (or include) photos, text, or other visual or audio content. In addition to the digital content items, the channel inputs 106 include channel metadata 114.

As used herein, the term "channel metadata" refers to data that is descriptive of a channel as a whole. In contrast to channel content and metadata specific to individual digital content items (e.g., video title, video description), the channel metadata 114 includes channel data that can be retrieved and assessed independent of the digital content items and their associated metadata. For example, the channel metadata 114 may include information such as channel history information (e.g., historical changes in the number of digital content items available through the channel, frequency content additions/removals, videos approved for monetization via advertising, and historical viewing statistics); network traffic statistics including the number of subscribers or followers of the channel 104 or the average number of user views of each of the relevant digital content items; metadata describing the nature of the channel (e.g., category, topic id, content type), a recorded number of user engagement signals (e.g., the number of 'likes', 'dislikes', 'favorites', 'comments' or 'shares' associated with the channel 104 or various digital content items of the channel), demographics of users subscribed to the channel as well as user-created supplemental channel content such as a channel banner, avatar representing the channel, channel description, or a bio provided by the creator of the channel. As used herein, a user is said to be "subscribed" to a channel when the user has a social media account with a setting that is configured to selectively receive content from the channel while not receiving content from one or more other channels managed by the same digital video platform (also referred herein as a channel provider or a source domain).

By example and without limitation, the sentiment prediction engine 102 is shown to include multiple sub-engines: a text analysis engine 118, an visual analysis engine 128, an audio analysis engine 154, and a channel analysis engine 138, each of which may be understood as including software and/or a combination of software and hardware, designed to analyze a set of inputs and generate an associated sentiment prediction (e.g., a textual risk metric 124, a visual risk metric 136, an audio risk metric 156, and a channel risk metric 140). Some implementations of the disclosed technology included fewer than all of the sub-engines shown in FIG. 1. For example, one implementation includes only channel analysis engine 138. Other implementations include the channel analysis engine 138 used in combination with one or more of the text analysis engine 118, the visual analysis engine 1228, and audio analysis engine 154.

In FIG. 1, a metric aggregator 142 aggregates together the outputs of the text analysis engine 118, the visual analysis engine 128, the audio analysis engine 154, and channel analysis engine 138 to render the sentiment prediction 108. In implementations where the sentiment prediction engine 102 includes fewer than all of the sub-engines shown in FIG. 1, the sentiment prediction 108 may be based on the outputs of the sub-engines that are included. In some implementations, the sentiment prediction 108 is based on outputs from an individual one of the engines shown (e.g., 118, 128, or 138) or based on outputs of two of these engines.

Each of the text analysis engine 118, visual analysis engine 128, audio analysis engine 154, and channel analysis engine 138 processes different inputs associated with the digital channel 104 and outputs a sentiment indicator (e.g., a textual risk metric 124, a visual risk metric 136, an audio risk metric 156, and a channel risk metric 140). For example, the text analysis engine 118 outputs a textual risk metric 124; the visual analysis engine 128 outputs a visual risk metric 136 (which, in some implementations, includes both an image risk metric and a video risk metric); the audio analysis engine 154 outputs an audio risk metric 156; and the channel analysis engine 138 outputs a channel risk metric 140.

The sentiment indicators (e.g., 124, 136, 156, and 140) each quantify a risk of a viewer experiencing a negative sentiment when viewing the associated channel content. In different implementations, these sentiment indicators may be numerical, descriptive, or otherwise indicative of a degree of negative sentiment risk. In one implementation, the textual risk metric 124, the visual risk metric 136, and the channel risk metric 140 each identify a predefined risk category and a likelihood (probability) of a user associating the channel content with that risk category. For example, a sentiment indicator may indicate that the evaluated content is highly likely to be perceived as violent or not likely to be perceived as racially offensive.

In one implementation, the text analysis engine 118 parses and extracts keywords from the content items (e.g., 110, 112) of the channel 104 and analyzes the extracted text to render the textual risk metric 124. The textual content 120 may, for example, include text embedded within frames of a video file, audio transcript, and/or textual metadata associated with the content items of the digital channel. For example a content item 110 may include metadata such as a video title, a textual description, keywords and/or other text such as closed captioning defined in association with the content item 110, a written transcript of audio parsed from the file, text appearing within imagery or video of the file or a combination of the above.

The text analysis engine 118 analyzes the extracted keywords and, based on various evaluation criteria, generates the textual risk metric 124, which generally quantifies a risk that a viewer of the evaluated textual material may have a negative or strong reaction to the material. In one implementation, the textual risk metric 124 quantifies a probability of a viewer perceiving the textual content as being strongly associated with one or more predefined risk categories, such as violence, gore, nudity, profanity, etc. Further exemplary aspects of an exemplary text analysis engine are discussed below with respect to FIG. 2.

In another stage of analysis, the visual content 126 from the channel 104 is provided to a visual analysis engine 128. The visual content 126 may, for example, include video data and images. The visual analysis engine 128 analyzes the visual content 126 to render a visual risk metric 136, which generally quantifies a risk that a viewer of the evaluated visual material may have a negative or strong reaction to the evaluated visual content 126. In one implementation, the visual risk metric 136 quantifies a probability of a viewer perceiving the evaluated visual content as being strongly associated with one or more predefined risk categories, such as violence, gore, nudity, profanity, etc. In one implementation, the visual analysis engine 128 includes both an image (e.g., thumbnail) analysis engine and a video analysis engine. In this case, the visual risk metric 136 may include separate or aggregated metrics pertaining to images and videos.

Further aspects of an exemplary visual analysis engine are discussed below with respect to FIG. 3.

In another stage of analysis, the audio content 150 from the channel 104 is provided to an audio analysis engine 154. The audio analysis engine 154 analyzes the audio content 150 to render the audio risk metric 156, which generally quantifies a risk that a viewer of the evaluated audio material may have a negative or strong reaction to the evaluated audio content 150. In one implementation, the audio risk metric 156 quantifies a probability of a viewer perceiving the evaluated audio content as being strongly associated with one or more predefined risk categories, such as violence, racism, bullying, sexuality, profanity, etc. Further aspects of an exemplary audio recognition and classification engine are discussed below with respect to FIG. 4.

In addition to the components described above, the sentiment prediction engine 102 further includes a channel analysis engine 128 that analyzes channel statistics to render a channel risk metric 140. In general, the channel risk metric 140 quantifies a risk that viewers of the channel 104 may strongly or negatively react to content (e.g., the content items 110, 112) accessible via the channel 104. Unlike the textual risk metric 124, the audio risk metric 156, and the visual risk metric 136, the channel risk metric 140 is not directly based on an analysis of the content that is viewable via the channel 104. Rather, the channel risk metric 140 is based on channel metadata, such as metadata describing features of the channel as a whole (e.g., channel metrics), channel history, and information pertaining to the identity or associations of viewers or subscribers of the channel 104 (e.g., demographics and channel association analysis).

In FIG. 1, the channel analysis engine 138 is shown to include four sub-engines: a channel metrics analyzer 144, a channel association analyzer 146, a channel history analyzer 148, and a channel descriptor analyzer 158. Various implementations of the sentiment prediction engine 102 may include any combination of these four sub-engines. Some implementations of the sentiment prediction engine 102 may not include the channel analysis engine 138. Each of these sub-engines evaluates a different subset of the channel metadata 114. In one implementation, the channel risk metric 140 is rendered based on output from each of the channel metrics analyzer 144, the channel association analyzer 146, the channel history analyzer 148, and the channel descriptor analyzer 158. In other implementations, the channel risk metric 140 is based on output from fewer than all of the sub-engines shown and/or based on an analysis of channel statistic data in addition to or in lieu of the specific statistics discussed below.

If included, the channel metrics analyzer 144 analyzes channel metrics included within the channel metadata 114, such as channel metrics that may be tracked by the channel provider (e.g., a digital video platform such as YouTube- .com). The channel metrics may, for example, include channel statistics such as the number of content items available on a channel at a given point in time, the audience size of a given channel (e.g., the number of subscribers or followers), and a number and/or type of user interactions with content (e.g., engagement signals such as likes, dislikes, and comments). In general, the number of content items available on a channel at a given point in time and/or the audience size of a given channel can be strongly indicative of the degree of negative user sentiment associated with the channel 104. For example, compared to similar channels, a high ratio of channel subscribers to content items or channel subscribers total viewers over a specific period (e.g., month) available on a channel may indicate that the channel previously included a larger amount of digital content that is no longer available, such as because the content was removed as a result of content moderation actions of the digital media platform. Content promotors may, in general, want to avoid associating promotional content with channels whose content is frequently removed (example as a result of user complaints). For this reason, the channel metrics analyzer 144 executes logic that influences the channel risk metric 140 to indicate a higher degree of risk and/or higher negative sentiment risk when the ratio of total channel subscribers to number of content items available on the channel 104 exceeds a predetermined threshold.

In addition to the quantity of content available on the channel 104 and the number of subscribers/number of content items of the channel 104, subscribers/views over a specific period, the channel metrics analyzer 144 may, in some implementations, evaluate user engagement signals to determine the degree of strong or negative user sentiment associated with the channel 104 as a whole. For example, a channel that frequently receives a large number of both "likes" and "dislikes" may signify that content of the channel solicits strong emotional responses and/or that the channel is particularly divisive to the viewer audience (e.g., such as by promoting an agenda of a political party base that may be offensive and/or isolating to those with different political views). Advertisers may, in general, want to avoid associating promotional content with content that is deeply polarizing and/or that solicits strong mixed reactions. For this reason, the channel metrics analyzer 144 may execute logic that influences the channel risk metric 140 to indicate a higher degree of risk and/or higher negative sentiment risk when the quantity of user engagement signals (or the ratio of user engagement signals to subscribers) exceeds a threshold.

If included, the channel descriptor analyzer 158 analyzes user-created supplemental channel content including but not limited to content included within a user-designed channel banner, a user-selected avatar representing the channel, a user-created channel description, channel creator bio, etc. The channel descriptor analyzer 158 executes logic to determine that there exists a higher negative sentiment risk when descriptive channel metadata includes certain predefined keywords, phrases or topics or imagery associated with pre-defined categories. For example, a channel associated with a topic category: "Professional Wrestling" may have a higher likelihood of including violence, blood, and sexual-suggestive content in the imagery than the topic "Cooking Demonstration." In another implementation, the channel descriptor analyzer 158 executes logic to determine that a higher negative sentiment risk exists when channel imagery (e.g., channel banner or background image and or image/avatar associated with the channel) contains an image or text that is associated with a pre-defined category with negative sentiment (e.g., violence, hate, nudity, etc.).

If included, the channel history analyzer 148 analyzes trends in historical channel metadata such as changes in the number of videos available on a channel over time and/or changes in viewing statistics. For example, a decrease in the number of videos available on a channel may indicate that the channel previously broadcasted content that was taken down as a result of take-down requests to due copyright violations and/or other violations of the terms of a service of the channel service provider. Likewise, a significant reduction in the view-time over a specific period (e.g., monthly number of views or minutes watched) of the channel content may indicate negative sentiments about the type of content on the channel or a decision by the channel owner to remove some content (or make them unavailable to public). Some implementations of the disclosed technology may not include the channel history analyzer 148.

If included, the channel association analyzer 146 performs an association of various associations between the channel 104 and one or more other channels. For example, channels may be understood as being "associated" with one another when their respective content managers collaborate and broadcast content from each other's channels or marking the other channel as a favorite. Due to the cross-sharing of content and personal relations between channel managers, the negative sentiment risk for the channel 104 may, in some cases, be reliably assessed via an analysis of associated channels and their own respective channel inputs 106.

In one implementation, the channel association analyzer 146 identifies channels that have a shared subscriber base with the channel 104 and makes inferences about the channel 104 based on status information for the associated channels. For example, the channel association analyzer 146 may determine that there exists a high probability of strong or negative sentiment for the channel 104 if the channel's subscribers are also subscribed to a number of other channels that have a "disabled" (e.g., as a consequence of posting forbidden content violating the service provider's terms of agreement). Some implementations of the disclosed technology may not include the channel association analyzer 146. Based on an analysis of the channel metadata 114, including without limitation those described above, the channel analysis engine 138 calculates and outputs the channel risk metric 140.

The metric aggregator 142 aggregates the various sentiment indicators generated for the channel 104 to render the sentiment prediction 108 for the channel 104. In different implementations, this aggregation may be performed in a variety of different ways including without limitation averaging, weighted averaging, selective use of maximum/minimum values, etc.

In one embodiment, the sentiment prediction engine 102 calculates and outputs the sentiment prediction 108 for the channel 104 based on a combination of one or more of the textual risk metric(s) 124, the visual risk metric(s) 136, the audio risk metric, and the channel risk metric 140. The sentiment prediction 108 may be a single value or a label (such as low, medium and high) or a data set including various metrics for the channel 104. Notably, some implementations may calculate the sentiment prediction 108 using less than all four of the text analysis engine 118, visual analysis engine 128, the audio analysis engine, and the channel analysis engine 138, and/or include other risk analysis modules in addition to or in lieu of those shown.

The sentiment prediction 108 may, in some embodiments, quantify a probability of a viewer perceiving channel content (e.g., the textual content 120 and/or visual content 126) as being associated with (relevant to) one or more predefined risk categories, such as violence, gore, nudity, profanity, etc. In some implementations, the sentiment prediction engine 102 evaluates a subset of the content items (e.g., 110, 112) for the channel 104, such as a randomly-selected subset. In other implementations, the sentiment prediction engine 102 evaluates each one of the content items (e.g., 110, 112) of the channel 104. In one implementation where the textual risk metric 124, the audio risk metric 156, and the visual risk metric 136 are computed for each content individual digital content item analyzed for a channel, the sentiment prediction 108 may include a summary that specifies one or more of the textual risk metric 124, the audio risk metric 156, and the visual risk metric 136 in association with each individual digital content item analyzed for the channel 104.

Figure 2:
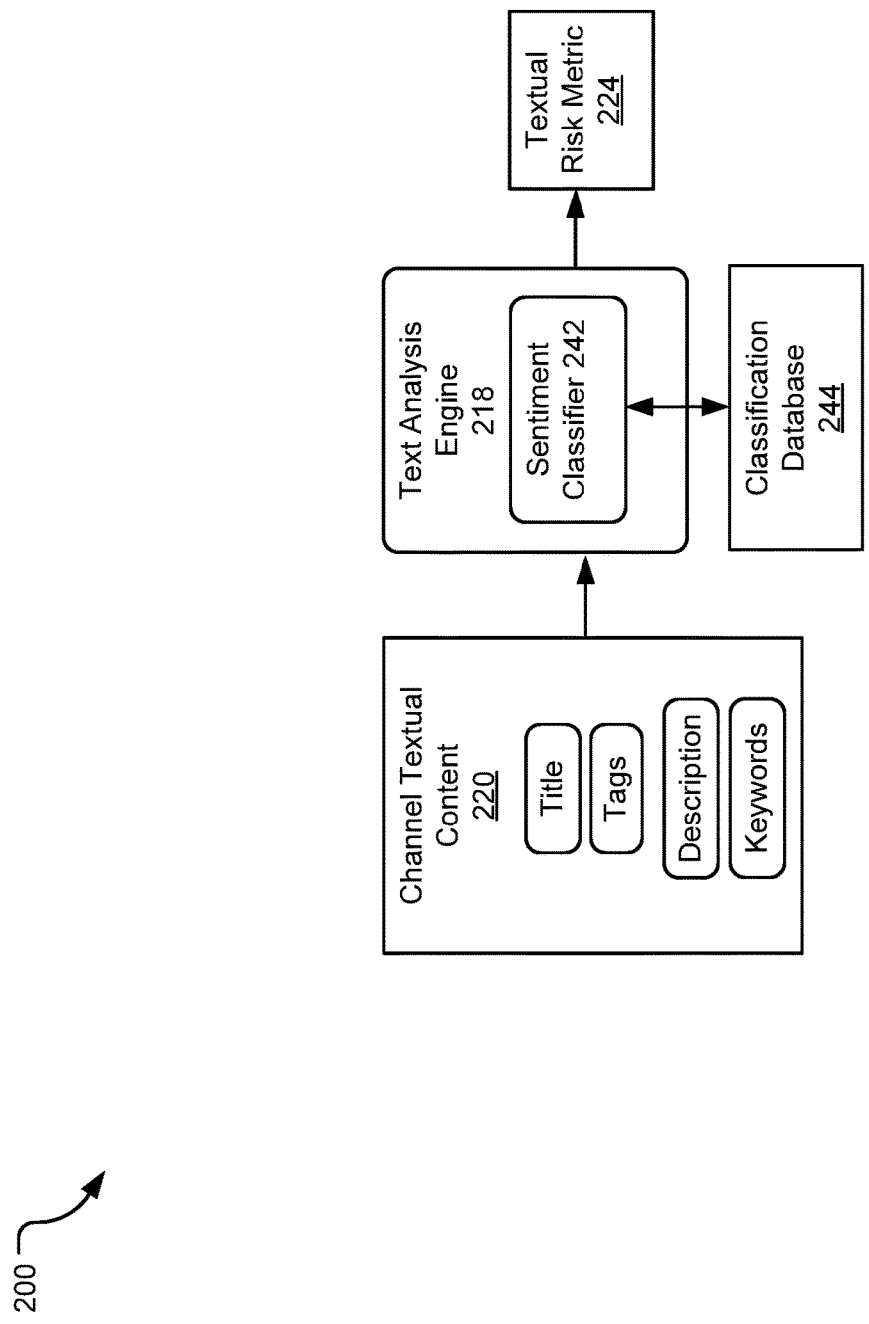
FIG. 2 illustrates aspects of another example system for predicting viewer sentiments associated with a collection of digital media content items available through a web-based channel.

FIG. 2 illustrates aspects of another example system 200 for predicting viewer sentiments associated with a collection of digital media content items available through a web-based channel. The system 200 includes a text analysis engine 218, which may include characteristics the same or similar to the text analysis engine 118 of FIG. 1. In one implementation, the text analysis engine 218 is designed to run within a sentiment prediction engine including components similar to FIG. 1 or any combination of its subcomponents. The text analysis engine 218 evaluates channel textual content 220 that has been parsed from content items received as part of a digital input channel. In different implementations, the channel textual content 220 may be parsed from the input digital channel by the text analysis engine 218 or by another processing entity (not shown).

The channel textual content 220 may include text embedded within one or more video(s) of the input channel, transcript of the audio content of the input channel, and/or textual metadata associated with the content items of the input channel. For example an individual digital content item (e.g., a video) of the input channel may include associated metadata such as a video title, a textual description, keywords and/or other text such as closed captioning or written transcript of audio parsed from the file, text appearing within imagery or video of the file or any combination thereof. The text analysis engine 218 analyzes this text and, based on various criteria, determines whether users are likely to have a negative or strong reaction to the content evaluated.

In different implementations, the text analysis engine 218 utilizes different analysis techniques to evaluate user sentiment associated with the extracted keywords. For example, the text analysis engine 218 may evaluate one or more different types of sentiment and/or strength of sentiment associated with the various types.

In one implementation, the text analysis engine 218 evaluates the channel textual content 220 by utilizing a classification database 244 generated by a sentiment classifier 242 trained to identify sentiments associated with different keywords. In one implementation, the sentiment classifier 242 may be Naive Bayesian machine learning algorithm that identifies and outputs keywords included within the channel textual content 220 that are highly correlated with certain categories of user sentiment. For example, the sentiment classifier 242 may be trained on a dataset including thousands of keywords, each associated with a particular sentiment, sentiment category, and/or a particular strength of the sentiment.

In one implementation, the sentiment classifier 242 is used to generate and/or append to lists of keywords that satisfy a predefined correlation with a particular predefined negative sentiment category (including but not limited to violence, bloody, sexually suggestive, weapon, drugs, gross or horror). For example, the text analysis engine 218 may translate the lists of keywords output by the sentiment classifier 242 into a variety of different languages and add those words to a classification database 244 that the text analysis engine 218 utilizes when analyzing the channel textual content 220 of a particular digital channel.

In the same or another implementation, the text analysis engine 218 matches keywords extracted from the textual content 120 to term(s) included within the classification database 244 having a known correlation to negative sentiment risk and/or to a particular type (e.g., category) of viewer sentiment risk. For example, the text analysis engine 218 may determine that the channel textual content 220 includes over 400 extracted terms known to have an association with negative user sentiment, with 200 terms as "violence", 185 terms as "hateful" or hate-speech, 60 terms as "scary", 40 terms as "gross" and 15 terms as "profanity." Using this information, the text analysis engine 218 calculates and outputs the textual risk metric 224.

Based on the above analysis of the channel textual content 220, the text analysis engine 218 determines and outputs a textual risk metric 224 quantifying a risk that users will negatively or strongly react to the channel content. In one implementation, the textual risk metric 224 is calculated for each individual content item, such as one for title and one for description of each video uploaded to the channel within a specified time frame. For example, the text analyzer may output a sentiment indicator that is numerical (e.g., 85%) or descriptive (e.g., "negative", "violent", "high profanity"), or otherwise indicative of a degree of negative sentiment risk for the channel in general (high risk, low risk, neutral risk). In other implementations, the textual risk metric 224 is computed for a collection of the content items of the channel. For example, the text analyzer may output a sentiment indicator that is numerical (e.g., 85%) or descriptive (e.g., "negative", "violent", "high profanity"), or otherwise indicative of a degree of negative sentiment risk for the channel as a whole (high risk channel, low risk channel, neutral risk channel).

Figure 3:
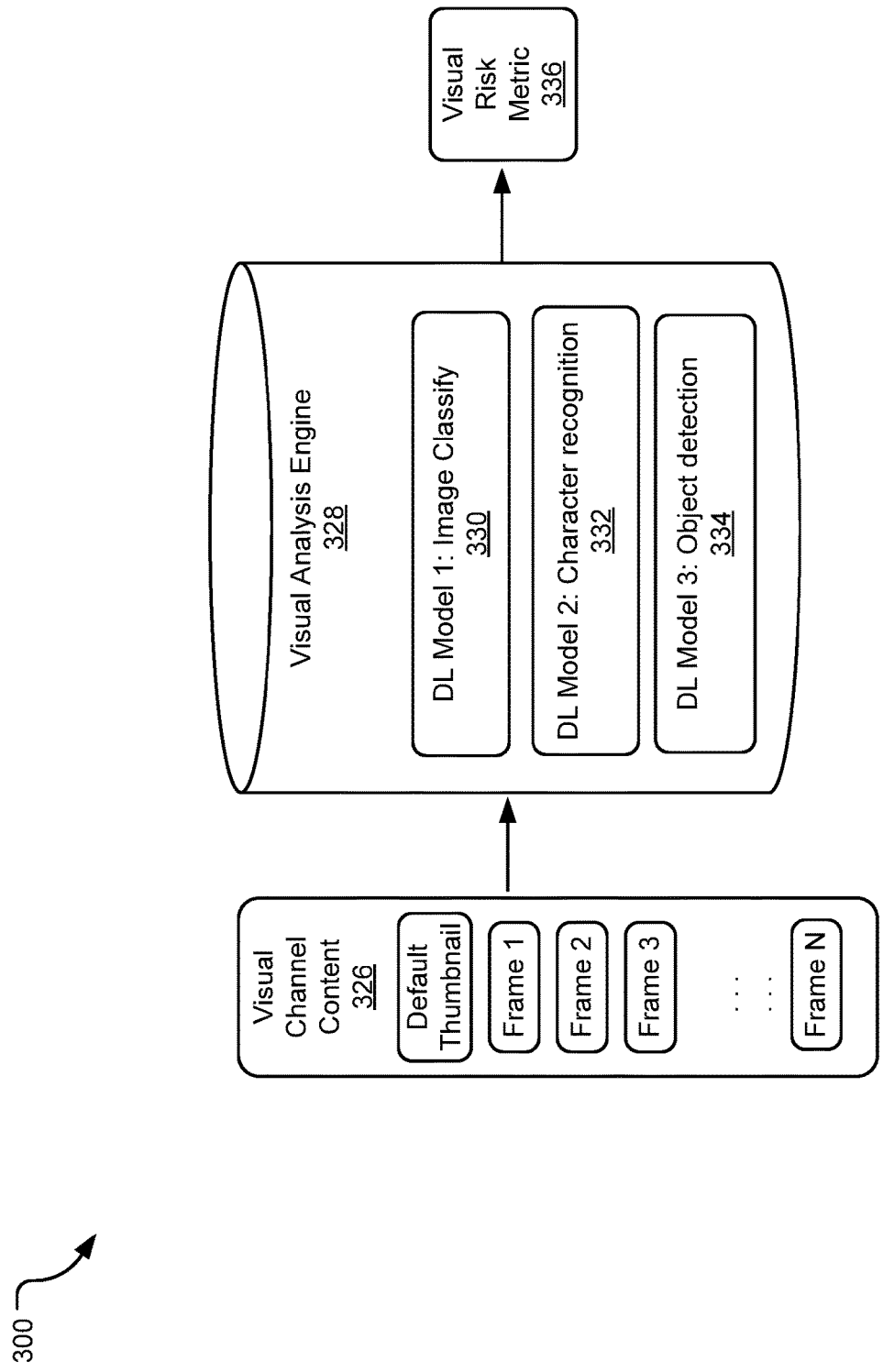
FIG. 3 illustrates aspects of another example system for predicting viewer sentiments associated with a collection of digital media content items.

FIG. 3 illustrates aspects of another example system 300 for predicting viewer sentiments associated with a collection of digital media content items available through a web-based channel. The system 300 includes a visual analysis engine 328, which may include characteristics the same or similar to the visual analysis engine 328 of FIG. 1. In one implementation, the system 300 is a subsystem designed to run within the system 100 of FIG. 1. In one implementation, the visual analysis engine 328 is designed to run within a sentiment prediction engine including components similar to FIG. 1 or any combination of its subcomponents. The visual analysis engine 328 receives visual content 326 parsed from an individual web-based channel (not shown). For example, the visual content 326 includes images and/or video data. The visual analysis engine 328 analyzes the visual content 326 to render a visual risk metric 336 that quantifies user sentiment(s) (e.g., a type of sentiment and/or strength of sentiment) that content of the channel is likely to invoke in viewers of the visual content 326. For example, the visual risk metric 336 may quantify an individual image or a collection of images or video segments for a data channel as "low risk of violence" or "high risk of nudity."

In different implementations, the image and video recognition and visual analysis engine 328 utilizes different image analysis techniques to evaluate and/or quantify the types of user sentiments invoked by the visual content 326. In one implementation, the visual analysis engine 328 includes a deep learning classifier 330 that has been trained with images and predefined risk categories (e.g., violence, bloody, sexually suggestive, drugs and horror). The deep learning classifier 330 identifies imagery within the visual content 326 that is correlated with negative user sentiment and/or associated with one of the predefined risk categories (e.g., horror, obscenity). For example the deep learning classifier 330 may determine that an image including a gun provokes a higher than average negative sentiment risk. In various implementations, the deep learning classifier 330 may be replaced by any of a number of different classification algorithms including Bayesian, support vector machine, or decision tree classifiers.

In another implementation, the visual analysis engine 328 utilizes different video analysis techniques to evaluate and/or quantify the types of user sentiments invoked by the visual content 326, such as sentiments invoked by an entire video or segments of the video (e.g., one or more selected frames). In one implementation, the visual analysis engine 328 includes a deep learning classifier 330 that has been trained with video and predefined risk categories (e.g., violence, bloody, sexually suggestive, drugs and horror). The deep learning classifier 330 identifies video segments within the visual content 326 that are correlated with negative user sentiment and/or associated with one of the predefined risk categories (e.g., horror, obscenity). For example, the deep learning classifier 330 may determine that a video segment including a gun provokes a higher than average negative sentiment risk. In various implementations, the deep learning classifier 330 may be replaced by any of a number of different classification algorithms including Bayesian, support vector machine, and decision tree classifiers.

In some cases, the sentiment invoked by digital content depends on the context in which the content is presented. For example, video game violence may be less likely to invoke negative sentiments than raw video footage of a real-life war scene. While the latter (real-life violence) is generally not accepted as advertiser-friendly, some content promoters may believe that it is ok to associate their brands and/or products with the former (video game violence). Therefore, some implementations of the deep learning classifier 330 perform a context-based evaluation. In one such implementation, the deep learning classifier 330 initially performs an image-type classification to select an image-type identifier. For example, the image is identified as being either "natural" (e.g., a photograph of a landscape) or "synthetic" (e.g., computer generated graphics such as a cartoon or gaming animation).

In a secondary stage of context-based image analysis, deep learning classifier 330 analyzes the imagery depicted in each image to select a corresponding category sentiment descriptor. For example, the category sentiment descriptor may be: "violent," "sexually suggestive," "horror," etc. In these cases, a final visual risk metric may be determined for each image by assessing a predetermined correlation between the image's categorical sentiment descriptor and the corresponding image type identifier. Using this approach, a violent natural image may, for example, be defined as having a first degree of risk (e.g., high risk for a violent photograph) while a violent synthetic image may be defined as having a second degree of risk (e.g., medium risk), which may be appropriate since many adults are less offended by violent graphics than violent photographs. While the deep learning classifier 330 is discussed above with respect primarily to image classification, some implementations of the deep learning or machine learning classifier 330 perform video analysis and classification.

In the same or another implementation, the visual analysis engine 328 includes an optical character recognition (OCR) module 332 that parses the visual content 326 to detect inappropriate text included within imagery, such as textual profanity that is included in one or more frames of a video. The visual analysis engine 328 analyzes the characters and text recognized by the OCR module 332 and parses the identified text and characters to evaluate correlations with negative user sentiment and/or one or more of the predefined risk categories, such as by relying on a pre-generated database of terms and/or characters (e.g., the classification database 244 described above with respect to FIG. 2).

In some implementations, the visual analysis engine 328 further includes an object detection module 334 that is trained to identify certain types of objects or entities that may invoke negative user sentiment in certain scenarios (e.g., syringe, knife, gun, drug paraphernalia, ghost, clown, grave, jail, toilet, blood, etc.). Objects recognized by the object detection module 334 may indicate that visual content is associated with a predefined risk category and/or contains some degrees of risk.

The visual analysis engine 328 uses outputs of one or more of the deep learning classifier 330, OCR module 332, and/or object detection module 334, to calculate and output the visual risk metric 336. For example, the visual risk metric 336 may indicate that the visual content 326 is "adult-oriented" or "violent" (e.g., due to images and objects detected and classified as such). In some implementations, the visual risk metric 336 may be a label to express a degree of negative sentiment risk overall (high risk, low risk, neutral risk) or in association with one or more of the predefined risk categories.

In different implementations, the visual analysis engine 328 may evaluate different quantities of content within the visual analysis engine 328. In one implementation, the image and video recognition and visual analysis engine 328 evaluates all images of a video or of a collection of videos from the associated digital channel. In still another implementation, computation time is reduced by evaluating a select subset of the channel visual content. For example, the visual analysis engine 328 may analyze a selected keyframe, and/or the thumbnail image from each video or for a subset of the videos (e.g., a randomly selected subset) of the channel. In these cases, the visual risk metric 336 is based on the analyzed subset of the visual content 326. For example, the visual risk metric 336 may represent an aggregation of visual risk metric score computed for each of the visual channel content items analyzed by the image and/or video recognition and classification engine. In one implementation, the visual risk metric 336 represents an average score of all content in a channel. In another implementation, the aggregate score calculates an average of a top 'M' number of scores that satisfy set criteria (e.g., the highest scores in a given risk category or overall).

Figure 4:
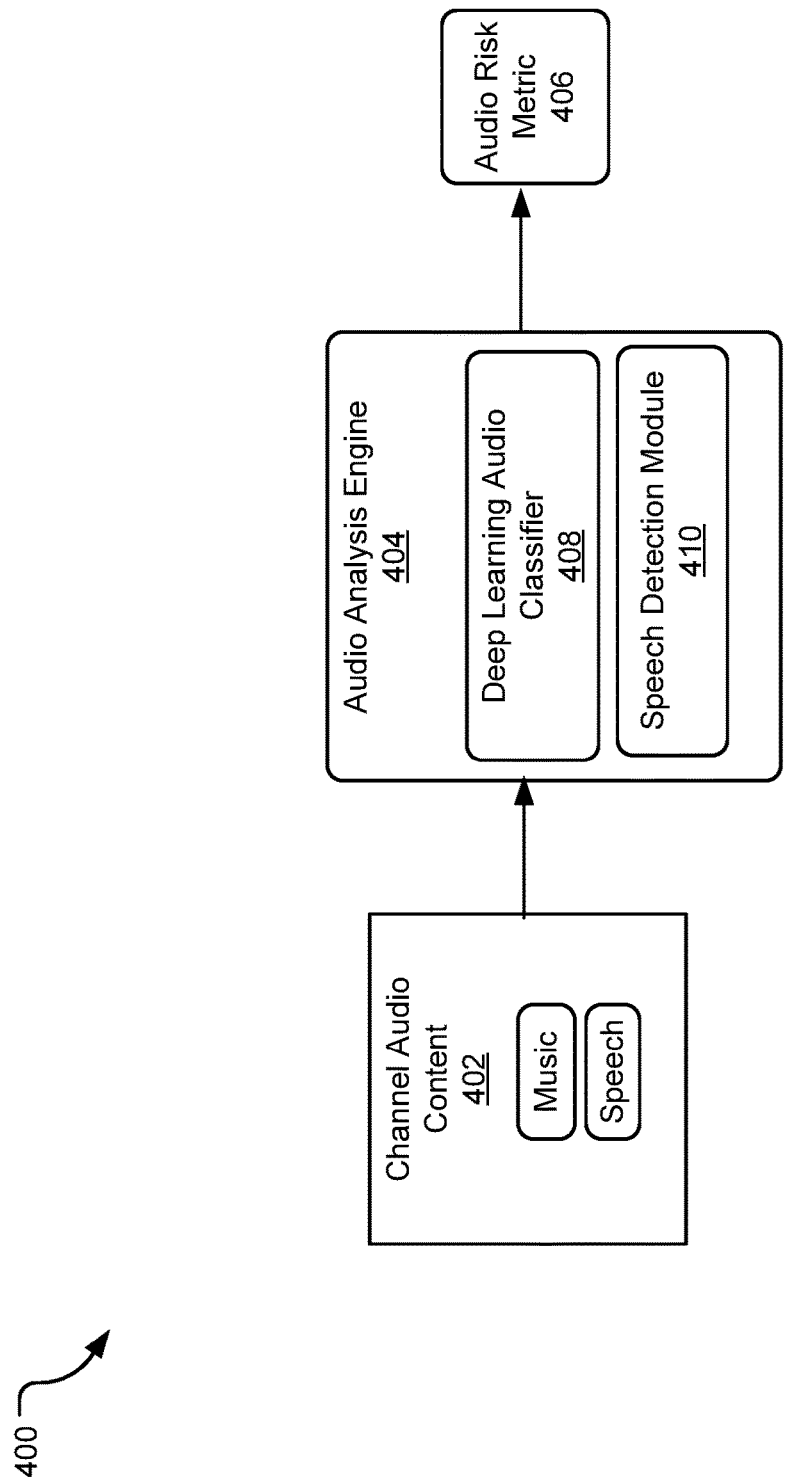
FIG. 4 illustrates aspects of another example system for predicting viewer sentiments associated with a collection of digital media content items.

FIG. 4 illustrates another example system 400 for predicting viewer sentiment associated with a collection of digital media content items available through a web-based channel. The system 400 includes an audio analysis engine 404, which may include the characteristics that are the same or similar to the audio recognition and classification engine of FIG. 1. In one implementation, the audio analysis engine 404 is designed to run within a sentiment prediction engine including components similar to FIG. 1 or any combination of its subcomponents.

The audio analysis engine 404 receives audio content 402 extracted from content of an individual web channel (not shown). For example, the audio content 402 might include both speech and music. The audio analysis engine 404 analyzes the audio content 402 to generate an audio risk metric 406 that quantifies user sentiment(s) (e.g., a type of sentiment and/or strength of sentiment) that content of the channel is likely to invoke in listeners in the audio content. For example, the audio risk metric 406 may quantify a segment or segments for a data channel as "low risk of violence" or "high risk of hate speech".

In different implementations, audio analysis engine 404 utilizes different audio analysis techniques to evaluate and/or quantify the types of user sentiments invoked by the audio content. In one implementation, the audio analysis engine 404 includes a deep learning audio classifier 408 that has been trained with audio segments and predefined risk categories (e.g., profanity, violence, hate speech and horror). The deep learning audio classifier 408 identifies audio segments within the audio content that are correlated with negative user sentiment and/or associated with one of the predefined risk categories (e.g., horror, hate speech). For example, the deep learning audio classifier 408 may determine that an audio segment of a person's screams or gun fire provokes a higher than average negative sentiment risk (e.g., greater than 50% risk or negative sentiment). In various implementations, the deep learning audio classifier 408 may be replaced by any of a number of different classification algorithms including Bayesian, support vector machine, and decision tree classifiers.

In some cases, the sentiment invoked by audio content depends on the context in which the content is presented. For example, the audio associated with video game violence may be less likely to invoke negative sentiments than raw video footage of a real-life war scene. While the latter (real-life violence) is generally not accepted as advertiser-friendly, some content promoters may believe that it is ok to associate their brands and/or products with the former (video game violence). Therefore, some implementations of the audio classifier perform a context-based evaluation.

In an exemplary stage of a context-based audio analysis, the deep learning audio classifier 408 analyzes the audio segments in a video file to select a corresponding category sentiment descriptor. For example, the category sentiment descriptor may be: "violent," "profane," "horror," etc. In these cases, a final audio risk metric may be determined for each audio by assessing a predetermined correlation between the audio's categorical sentiment descriptor and the corresponding audio type identifier. Using this approach, a violent audio segment may, for example, be defined as having a first degree of risk (e.g., high risk for a violent audio segment) while audio associated with a violent synthetic video may be defined as having a second degree of risk (e.g., medium risk), which may be appropriate since many adults are less offended by violent graphics than violent photographs.

In some implementations, the audio analysis engine 404 module further includes a speech detection module 410 that determines whether or not the channel audio content 402 includes spoken commentary. Some content creators create non-music content (e.g., slide shows, news, game plays, etc.) without any speech or commentary. In one implementation, the audio recognition algorithm determines if there is no speech or commentary in a significant number of videos in a channel (e.g., more than half of the videos). If the channel is a music channel, the channel may therefore be considered as low-value for content promotors and this may be flagged as an output within or in addition to the audio risk metric 406.

In another implementation, the speech detection module 410 includes a synthetic voice detector that determines if the speech mostly includes synthetic voice. Content with synthetic audio may, in some implementations, be considered to be of low value to content promotors and the presence of synthetic audio may therefore be included as an output within or in addition to the audio risk metric 406.

In different implementations, the audio analysis engine 404 evaluates different quantities of the channel audio content 402 for a given channel. In one implementation, the audio analysis engine analyzes a subset of audio segments selected to have 50% overlap with one another (e.g., a sliding window). In still another implementation, computation time is reduced by evaluating a select subset of the channel audio content. For example, the audio analysis engine 404 may analyze a randomly-selected subset of all audio segments that can be extracted for a channel. In these cases, the audio risk metric 406 is based on the analyzed subset of the audio content. For example, the audio risk metric 406 may represent an aggregation of audio risk metric score computed for each of the audio channel content items analyzed by the audio recognition and classification engine. In one implementation, the audio risk metric represents an average score of all content in a channel. In another implementation, the aggregate score calculates an average of a top 'M' number of scores that satisfy set criteria (e.g., the highest scores in a given risk category or overall).

Figure 5:
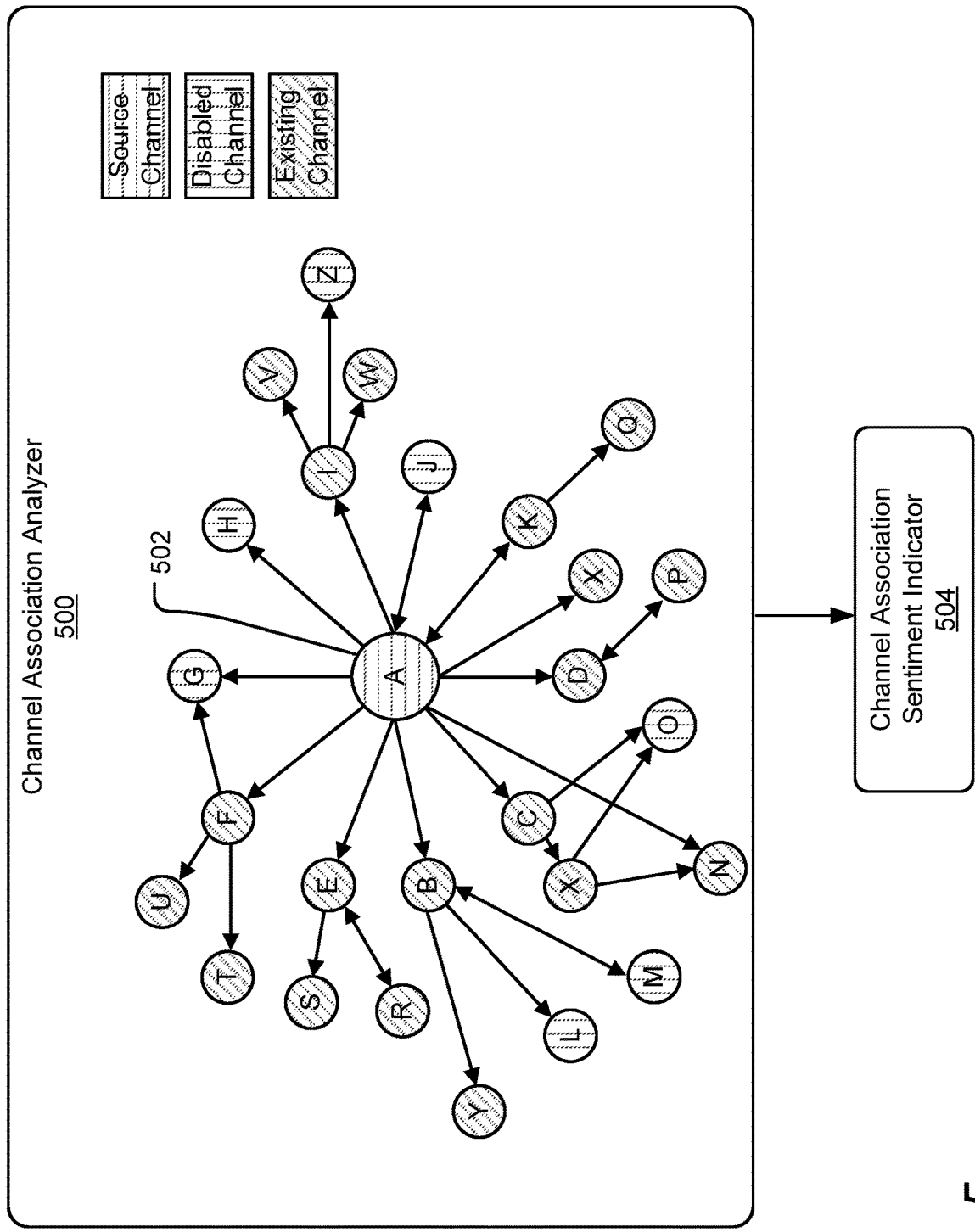
FIG. 5 illustrates aspects of still another example system for predicting viewer sentiments associated with a collection of digital media content items.

FIG. 5 illustrates an example channel association analyzer 500 for predicting a negative sentiment risk posed by a collection of digital media content items available through a web-based channel. In one implementation, the channel association analyzer 500 includes characteristics the same or similar to those described above with respect to FIG. 1. In one implementation, the channel association analyzer 500 is designed to run within a sentiment prediction engine including components similar to FIG. 1 or any combination of its subcomponents. The channel association analyzer 500 may, in some implementations, be incorporated within a sentiment prediction engine that renders a sentiment prediction for a web-based channel, such as the sentiment prediction engine 102 shown in FIG. 1.

The channel association analyzer 500 performs an analysis of associations between different channels, each represented in FIG. 4 by an alphabetical letter A-Z. In one implementation, the different channels A-Z each represent a web-based digital content channel that is available through a same source domain managed by the same digital media platform. For example, each of the channels A-Z may represent a different YouTube channel managed by a different content manager with an associated user profile on a same source domain (e.g., www.youtube.com).

In FIG. 5, the channel association analyzer 500 is shown determining a channel association sentiment indicator 504 (e.g., a metric quantifying negative sentiment risk) for a source channel 502 (channel A), based on the associations between channel A and other channels (B-Z). In the example shown, channel A is managed by a content manager with a user account at a particular source domain (e.g., youtube.com). The content manager of channel A configured the associated user account to subscribe to content of a subset of other channels, referred to herein as "first tier association channels"). In FIG. 5, first tier association channels are indicated by the arrows extending away from channel A. Here, the content manager for channel A has a user account that is subscribed to content from channels B, C, D, E, F, G, H, I, J, K, and X. Some of these channels (e.g., channels I, J, and K) are managed by individuals with user accounts that have mutually subscribed to follow content from the source channel 502 (channel A). These cross-associations are indicated by bidirectional arrows (e.g., arrows between channel A and channels I, J, and K).

Each of the first tier association channels (B, C, D, E, F, G, H, I, J, K, and X) is managed by a content manager with a user account subscribed that may be subscribed to one or more other channels, referred to herein as "second tier association channels." For example, channel E has a content manager with a user account subscribed to channels S and R. Channel B has a content manager with a user account subscribed to channels Y, L, and M. Although not shown, it may be understood that the second-tier association channels (e.g., L, M, O, P, Q, R, S, T, U, V, W, Y, Z) may each be managed by a content manager with a user account subscribed to one or more third-tier channels. For example, channel N has a first tier association to channel A and X. Channel X has a second tier association to channel A.

The channel association analyzer 500 determines the channel association sentiment indicator 504 of the source channel 502 based on channel metadata pertaining to one or more of its associated channels B-Z. In various implementations, the channel association analyzer 500 may evaluate the channel association sentiment indicator 504 based on different types of channel metadata for each of its associated channels, B-Z. In one implementation, the channel association analyzer 500 determines the channel association sentiment indicator 504 based on a particular field of metadata that can be classified as having a negative or positive impact on viewer sentiment based on its value.

In the example of FIG. 5, the channel association analyzer 500 is shown evaluating a metadata field representing a channel status. In FIG. 4, the channel status represents whether or not the associated channel is currently "enabled" or "disabled." For example, the channel status may be a descriptor set by the source domain (e.g., the digital media platform) indicating the current channel status. A disabled channel may, for example, be a channel that was shut-down (terminated) by the digital media platform, such as due to a failure of the channel's content manger to abide by terms of service of the digital media platform. For example, channels L, M, O, G, J, and Z represent channels that have been disabled because their associated content managers have posted content that violates copyright or trademark laws, or that includes obscene context that is prohibited by the digital media platform's terms of service. Here, the channel association analyzer 500 classifies disabled channels as "negative channel associations" (e.g., negatively impacting the channel association sentiment indicator 504) and classifies enabled channels as "positive channel associations" (e.g., positively impacting the channel association sentiment indicator 504). In one implementation, the channel association analyzer 500 determines the channel association sentiment indicator 504 for a source channel (A) based on the number of negative channel associations and/or positive channel associations.

Equation (1), below, represents one example of the channel association sentiment indicator 504 (risk_score). In some implementations, the channel association sentiment indicator 504 is an exclusive risk metric that a sentiment analysis engine computes based on channel metadata (e.g., the channel association sentiment indicator 504 is the channel risk metric 140 of FIG. 1). In other implementations, the channel association sentiment indicator 504 is one of multiple metrics computed based on channel metadata that are collectively factored into an overall channel risk metric for the channel.

$$\text{risk\_score} = \begin{pmatrix} \max\left(1, p \times \frac{N_i^a}{N_i}\right) & \text{if } N_i \geq q \\ \max\left(1, \frac{p \sum_1^{N_i} \frac{N_{ij}^a}{N_{ij}}}{N_i}\right) & \text{if } N_i < q \end{pmatrix} \quad (1)$$

In Equation 1, the variables p and q are threshold parameters set for each application (e.g., p=5; q=10). Additionally, $N_i^a$ represents the number of positive channel associations (e.g., enabled channels) that form a first tier association with the source channel 502; $N_{ij}^a$ represents the number of positive channel associations that form a second tier association with the source channel 502; $N_i$ represents the total number of channels that form a first tier association with the source channel 502; and $N_{ij}$ represents the total number of channels that form a second tier association with the source channel 502. In equation (1), the risk_score is based on first tier associations of the source channel 502 when the total number of first tier associations is greater than q and based on both first and second tier associations of the source channel 502 when the total number of first tier associations is less than q.

In one implementation, the channel association analyzer 500 outputs the channel association sentiment indicator 504. In another implementation, the channel association analyzer 500 outputs a binary value indicative of a negative sentiment for the channel due to the analyzed negative associations. For example, the channel association analyzer 500 may output a '1' when the risk_score exceeds a predetermined threshold (e.g., indicating that the channel associations suggest a strong probability of negative sentiment risk) and output a '0' when the risk_score does not exceed the predetermined threshold (e.g., indicating that the channel associations do not present a significant degree of negative sentiment risk).

Figure 6:
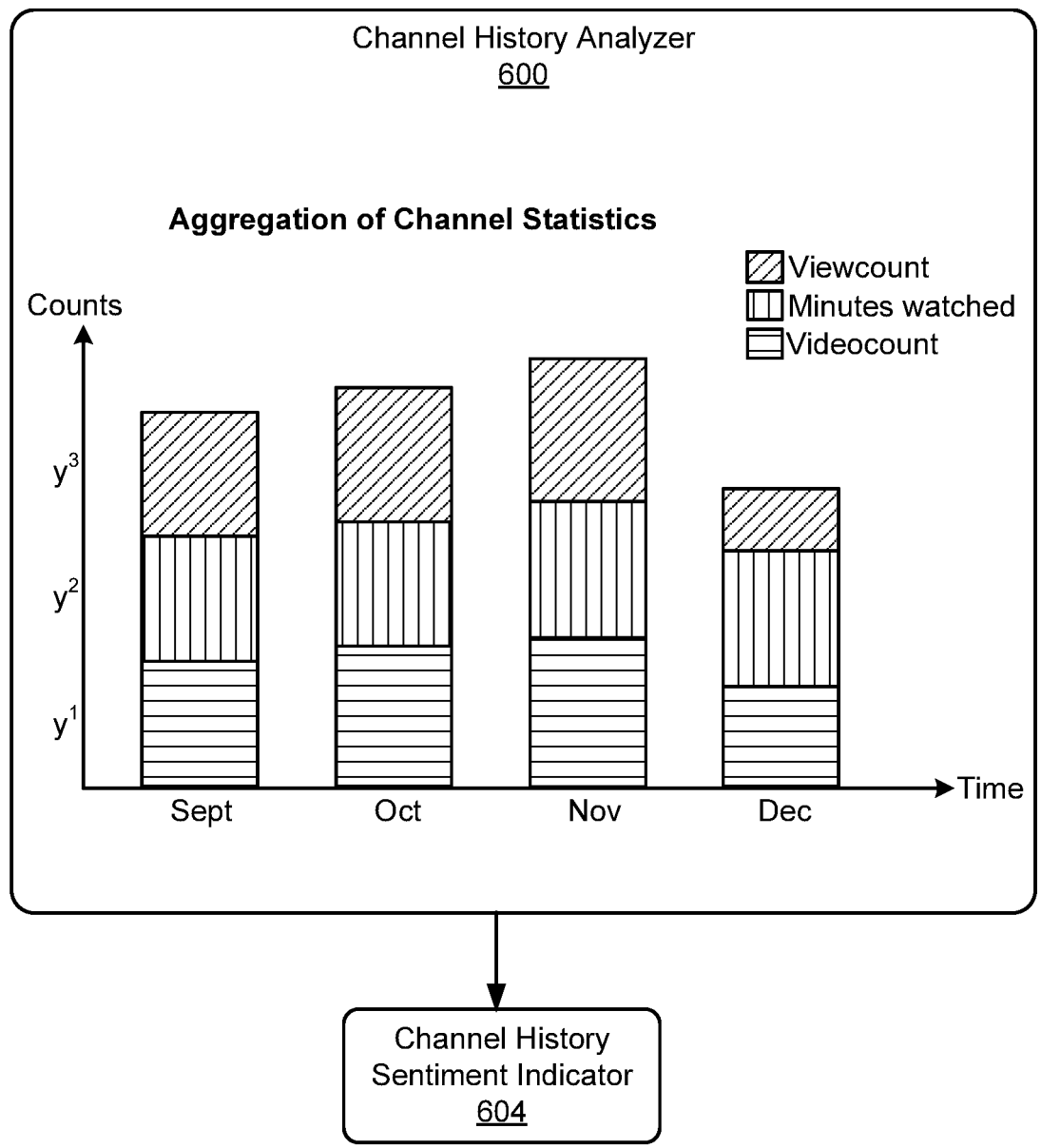
FIG. 6 illustrates aspects of yet another example system for predicting viewer sentiments associated with a collection of digital media content items

FIG. 6 illustrates an example channel history analyzer 600 for predicting a negative sentiment risk posed by a collection of digital media content items available through a web-based channel. In one implementation, the channel history analyzer 600 includes characteristics that may be the same or similar to those described above with respect to FIG. 1. In one implementation, the channel history analyzer 600 is designed to run within a sentiment prediction engine including components similar to FIG. 1 or any combination of its subcomponents. The channel history analyzer 600 may, in some implementations, be incorporated within a sentiment prediction engine that renders a sentiment prediction for a web-based channel, such as the sentiment prediction engine 102 shown in FIG. 1.

The channel history analyzer 600 analyzes trends in historical channel metadata such as changes in the number of videos available on a channel over time and/or changes in viewing statistics to compute a channel history sentiment indicator 604. In some implementations, the channel history sentiment indicator 604 is an exclusive risk metric that a channel analysis engine computes based on channel metadata. For example, the channel history sentiment indicator 604 may be the channel risk metric 140 of FIG. 1. In other implementations, the channel history sentiment indicator 604 is one of multiple metrics computed based on channel metadata that are collectively factored into an overall channel risk metric for the channel.

In FIG. 6, a plot 602 illustrates an aggregation of channel statistics for an individual channel after the course of multiple days. In particular, the plot 602 shows changes in three different viewing statistics: (1) "viewcount," which represents the number of times the content items (e.g., videos) watched on the channel; (2) "minutes watched," representing a total cumulative amount of time that users spent viewing content of the channel; and (3) "content count," which represents a number of content items (e.g., videos) available on the channel for viewing.

Day-to-day changes in the viewing statistics may be influenced by a number of factors. However, clean-up activity performed by digital media platforms can have a significant impact on these viewing statistics. For example, digital media platforms hosting social networks such as YouTube, Facebook, and Twitter frequently "clean up" (e.g., remove or render inaccessible) user-uploaded content (e.g., videos, photos, audio and text posts) that violates copyright and trademark laws or that otherwise violates the digital media platform's terms of service, such as content that is deemed obscene due to nudity, language, etc. Consequently, decreases in the amount of content available on a channel and/or decreases in the number of times the channel's content items viewed (e.g., each day) can signify a likelihood of increased negative sentiment risk to viewers. For example, a decrease in the number of videos available on a channel may indicate that the source domain is taking actions to effect removal of certain content from the channel. In the example shown, a noticeable decrease in the video count (number of videos available on the channel) occurs between November and December. This correlates with a noticeable decrease in the viewcount for the channel. The channel history analyzer 600 analyzes these viewing statistic to compute a risk metric (channel history_risk (CH_risk)), which generally indicates a likelihood—based on the channel history—that the channel content is to invoke strong or negative feelings in viewers.

Equation (2), below, represents one example channel history sentiment indicator 604 that the channel history analyzer 600 may compute.

$$CH_{-Risk} = \frac{1}{P}\sum_{j=1}^{P}\frac{1}{N}\sum_{i=1}^{N-1}\frac{\max(M_{j,i+1} - M_{j,i}, 0)}{M_{j,i}} \quad (2)$$

In equation (2), above, P is the number of metrics used for assessing the channel risk. Some of the metrics used can be the total number of minutes that viewers spent watching content of the channel on day or month 'i' or the average number of minutes per video that viewers spend watching content on day or month 'i' or represents the total number of content items viewed on the channel on day or month T or the average views of each video on the channel on day or month 'i'). N is the total number of data points where metric j has been collected and $M_{j,i}$ is the value of the parameter j at the time stamp i. In the example shown in FIG. 6, P=3, N=4, j=1, 2, or 3 and i=1, 2, 3, or 4.

Figure 7:
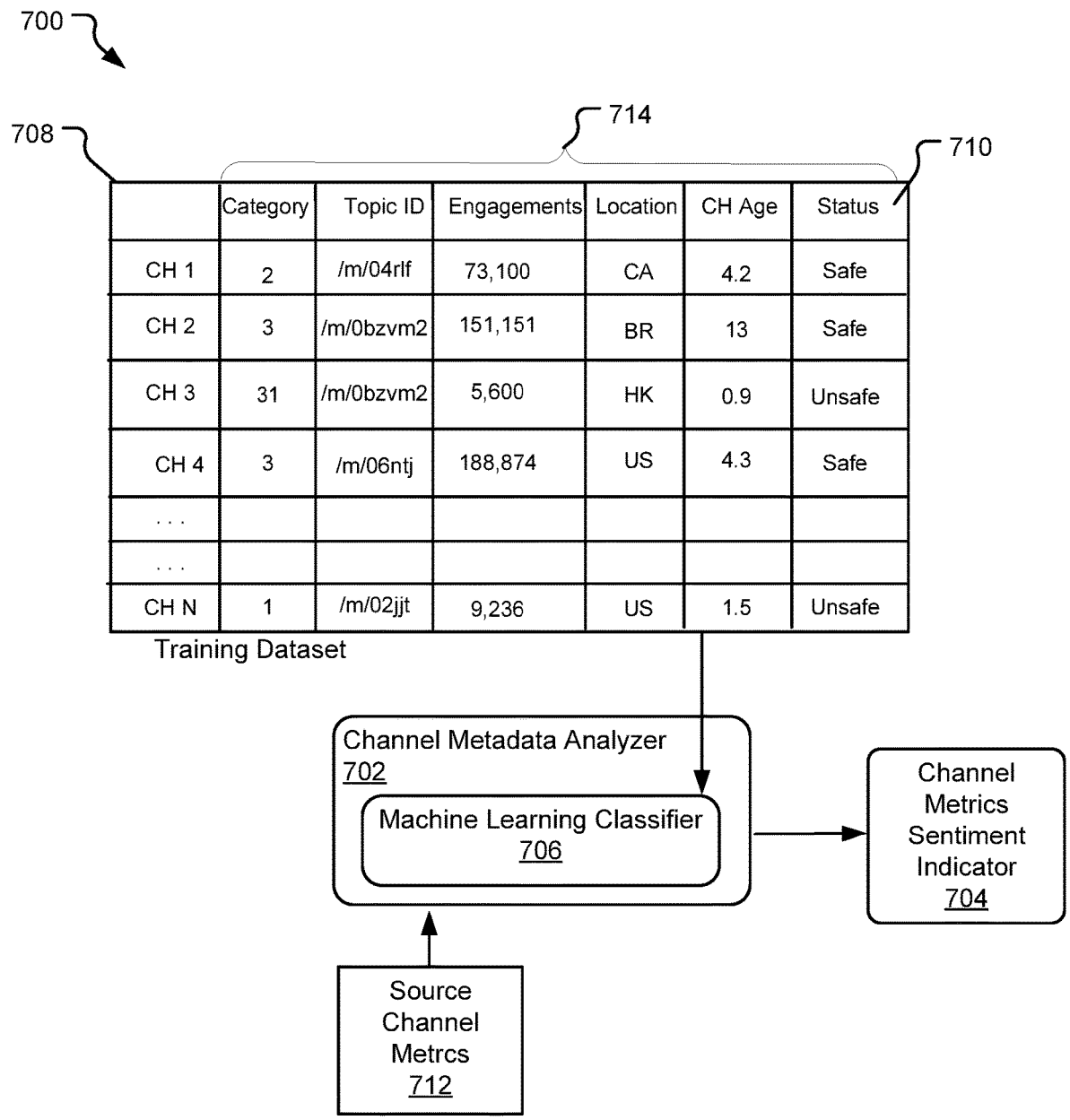
FIG. 7 illustrates aspects of another example system for predicting viewer sentiments associated with a collection of digital media content items.

FIG. 7 illustrates an example system 700 including a channel metric analyzer 702 for predicting a negative sentiment risk posed by a collection of digital media content items available through a web-based channel. In one implementation, the channel metrics analyzer 702 includes characteristics that may be the same or similar to those described above with respect to FIG. 1. In one implementation, the channel metrics analyzer 702 is designed to run within a sentiment prediction engine including components similar to FIG. 1 or any combination of its subcomponents. The channel metrics analyzer 702 may, in some implementations, be incorporated within a sentiment prediction engine that renders a sentiment prediction for a web-based channel, such as the sentiment prediction engine 102 shown in FIG. 1.

The channel metrics analyzer 702 analyzes channel metrics included within channel metadata (e.g., 114 in FIG. 1), such as channel metrics that may be tracked by the channel provider (e.g., a digital media platforms such as YouTube.com). In the example of FIG. 7, the channel metric analyzer 702 includes a machine learning classifier 706 trained on a training dataset 708 of channel metrics for a number of different channels (e.g., channel 1, channel 2, . . . channel N). The exemplary training dataset 708 includes a number of channel metrics 714, some of which provide demographic information about the channel, such as "location" (e.g., the location where the channel manager is geographically-based), and "channel age" (e.g., the amount of time in years since the date that the channel was created) and "engagements" (e.g., a number of likes, comments, and/or subscribers to a channel). Additionally, the training dataset 708 includes other channel metrics defining a "category" for the channel content, a more detailed description of the subject of the content ("TopicID"), and "engagements."

The various channel metrics included in the training dataset 708 may, in various implementations, include other channel metrics in addition to or in lieu of those shown. Each of the channel metrics may have a value populated by the digital media platforms or by a content manager of the channel. For example, the digital media platforms may automatically set value(s) for each of the channel metrics (e.g., category, Topic ID, etc.) or a content manager may provide one or more such values during the channel set-up process.

The channel metrics shown in the training dataset 708 are meant to be exemplary. Here, the channel metric "category" assumes a numerical value representative of a category in which the content of the association channel can generally be classified. For example, "category" may refer to Gaming, Music, Education, Entertainment, Sports, etc. In contrast, the Topic ID may references a more specific topic (e.g., subtopic), subject, or sub-category. If, for example, the category is "gaming" the Topic ID may specify the name of the game (e.g., Minecraft) or the type of game (e.g. First-person shooter). The channel metric "engagements" indicates a number of user engagements with content of the channel over its history (e.g., total number of likes, dislikes, comments). The metadata field "location" refers to a geographical location where a content manager of the channel resides, such as a location identified by the digital media platforms based on an internet protocol (IP) address of the content manager (e.g., in their profile) or based on information provided by the content manager. Finally, "channel age" refers to the total amount of time that the channel has been in existence.

In addition to the channel metrics 714, training dataset 708 includes a predefined risk quantifier 710 in association with each channel. In FIG. 7, the predefined risk quantifier 710 is a value indicating whether or not the channel has been pre-identified as one that is likely (according to a computed metric) to invoke strong or negative sentiment in viewers. In the example shown, the predefined risk quantifier 710 indicates whether the channel is safe (indicating a negative risk metric below a set threshold) or unsafe (indicating a negative risk metric above a set threshold). In one implementation, the channel provider (e.g., YouTube) creates the predefined risk quantifier 710 for each channel. For example, the predefined risk quantifier 710 may be switched from "safe" (or logical state '1') to "unsafe" (logical state '0') when the digital media platforms forcibly removes one or more (e.g., a threshold number) of content items from the channel. In another implementation, the predefined risk metric may be a descriptive label such as very unsafe, unsafe, safe, very safe (although the title and the number of labels may be different). In yet another implementation, the predefined risk metric may include a numerical value (such as 0 to 5) with a low number such as 0 indicating a very risky channel and a high number such as 5 indicating a very risky channel.

In the example shown in FIG. 7, the machine learning classifier 706 is a two-way classifier trained based on the training dataset 708 to classify a source channel as "safe" or "unsafe" based on an assessment of metadata for the source channel (e.g., source channel metadata 712). In one implementation, the source channel metadata 712 includes the same structure and fields of metadata that are included in the training dataset 708 and utilized to train the machine learning classifier 706. In one implementation, the machine learning classifier 706 applies a random forest (RF) model to determine whether channel metadata indicates that a channel is safe (e.g., poses a neutral sentiment risk) or unsafe (e.g., poses a negative sentiment risk). In other implementations, the machine learning classifier 706 applies different classification methods such as decision trees and nearest neighbor classifiers.

The machine learning classifier 706 applies its two-way classification logic to output a channel metrics sentiment indicator 704 indicative of a negative sentiment risk association with the channel. In the example of FIG. 7, the channel metrics sentiment indicator 704 may output a classification of "safe" or "unsafe" (e.g., a classification of a format identical to that of the predefined risk quantifier 710 included in the training dataset 708 in association with each different data channel).

In some implementations, the channel metrics sentiment indicator 704 is an exclusive risk metric that a channel analysis engine computes based on channel metadata (e.g., channel metrics sentiment indicator 704 is the channel risk metric 140 of FIG. 1). In other implementations, the channel metrics sentiment indicator 704 is one of multiple metrics computed based on channel metadata that are collectively factored into an overall channel risk metric for the channel.

In some implementations, the channel metric analyzer 700 does not include the machine learning classifier 706 and instead utilizes other techniques to evaluate channel metadata and to thereby generate a channel metrics sentiment indicator.

Figure 8:
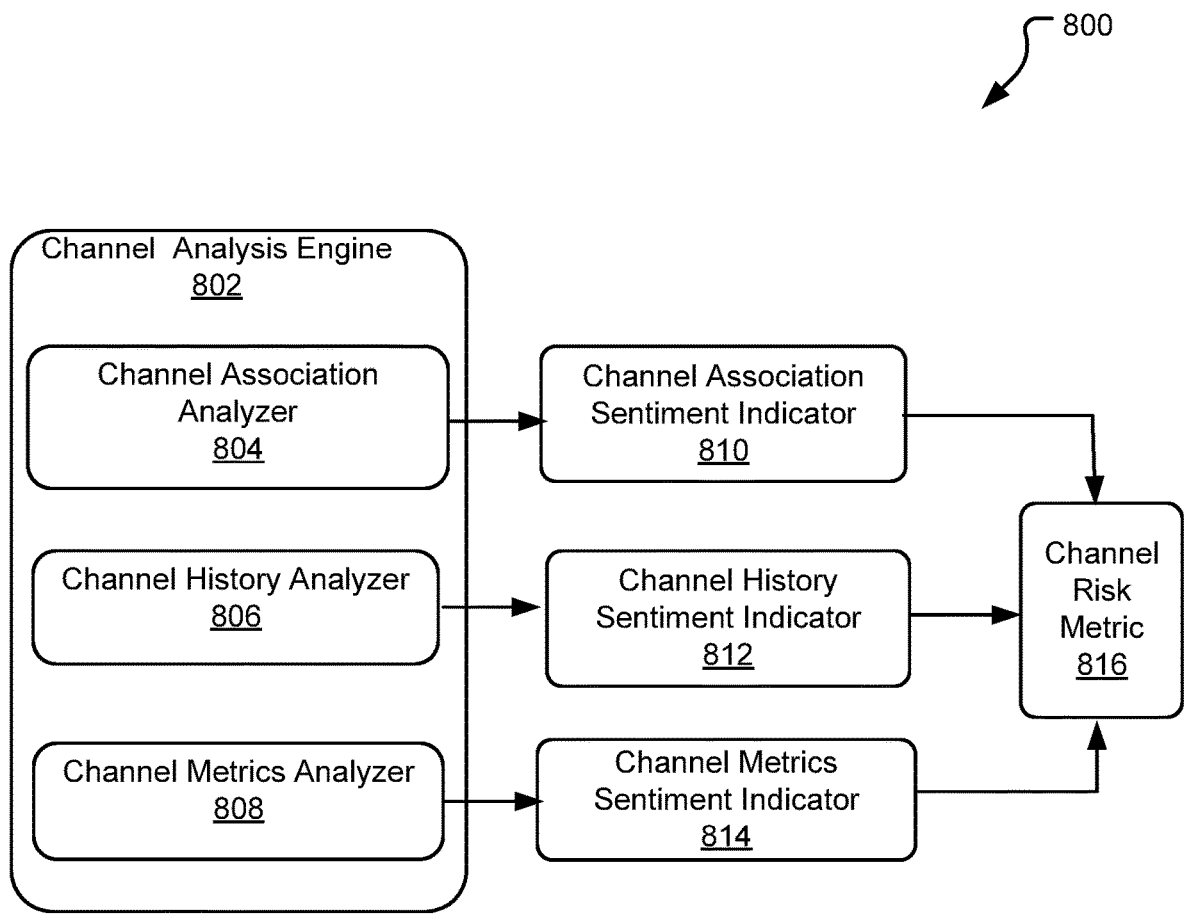
FIG. 8 illustrates aspects of still another example system for predicting viewer sentiments associated with a collection of digital media content items.

FIG. 8 illustrates aspects of another sentiment prediction system 800 for predicting a negative sentiment risk posed by a collection of digital media content items available through a web-based channel. The system includes a channel analysis engine 802, which further includes a channel association analyzer 804, a channel history analyzer 806, and a channel metrics analyzer 808. In one implementation, channel association analyzer 804 includes features the same or similar to the channel association analyzer 500 described with respect to FIG. 5. In the same or another implementation, the channel history analyzer 806 includes features the same or similar to the channel history analyzer 600 described with respect to FIG. 6, and the channel metrics analyzer 808 includes features the same or similar to the channel metrics analyzer 702 described with respect to FIG. 7.

Each of the channel association analyzer 804, the channel history analyzer 806, and the channel metrics analyzer 808 receive and evaluate channel metadata for a select web-based digital channel. The channel association analyzer 804 outputs a channel association sentiment indicator 810; the channel history analyzer 806 outputs a channel history sentiment indicator 812; and the channel metrics analyzer 808 outputs a channel metrics sentiment indicator 814.

The channel association sentiment indicator 810, the channel history sentiment indicator 812, and the channel metrics sentiment indicator 814 are combined to generate a channel risk metric 816, representing an overall indicator and/or quantification of negative sentiment risk for the evaluated digital content channel. In other implementations, the channel risk metric 816 may be determined based on additional metrics in addition to or in lieu of those shown (e.g., such as based on outputs of the channel descriptor analyzer 158 additionally described with respect to FIG. 1). In one implementation, the channel association sentiment indicator 810, the channel history sentiment indicator 812, and the channel metrics sentiment indicator 814 are numerical and the channel risk metric 816 represents an average of these three scores. In other implementations, different mathematical operators including but not limited to maximum and addition can be used to calculate the channel's risk metric.

As discussed above with respect to at least FIG. 1, the channel risk metric 816 may, in some implementations, be aggregated with a visual risk metric (e.g., a visual risk metric 136 in FIG. 1) and/or a textual risk metric (e.g., textual risk metric 124 in FIG. 1) to render a sentiment prediction for a data channel.

Figure 9:
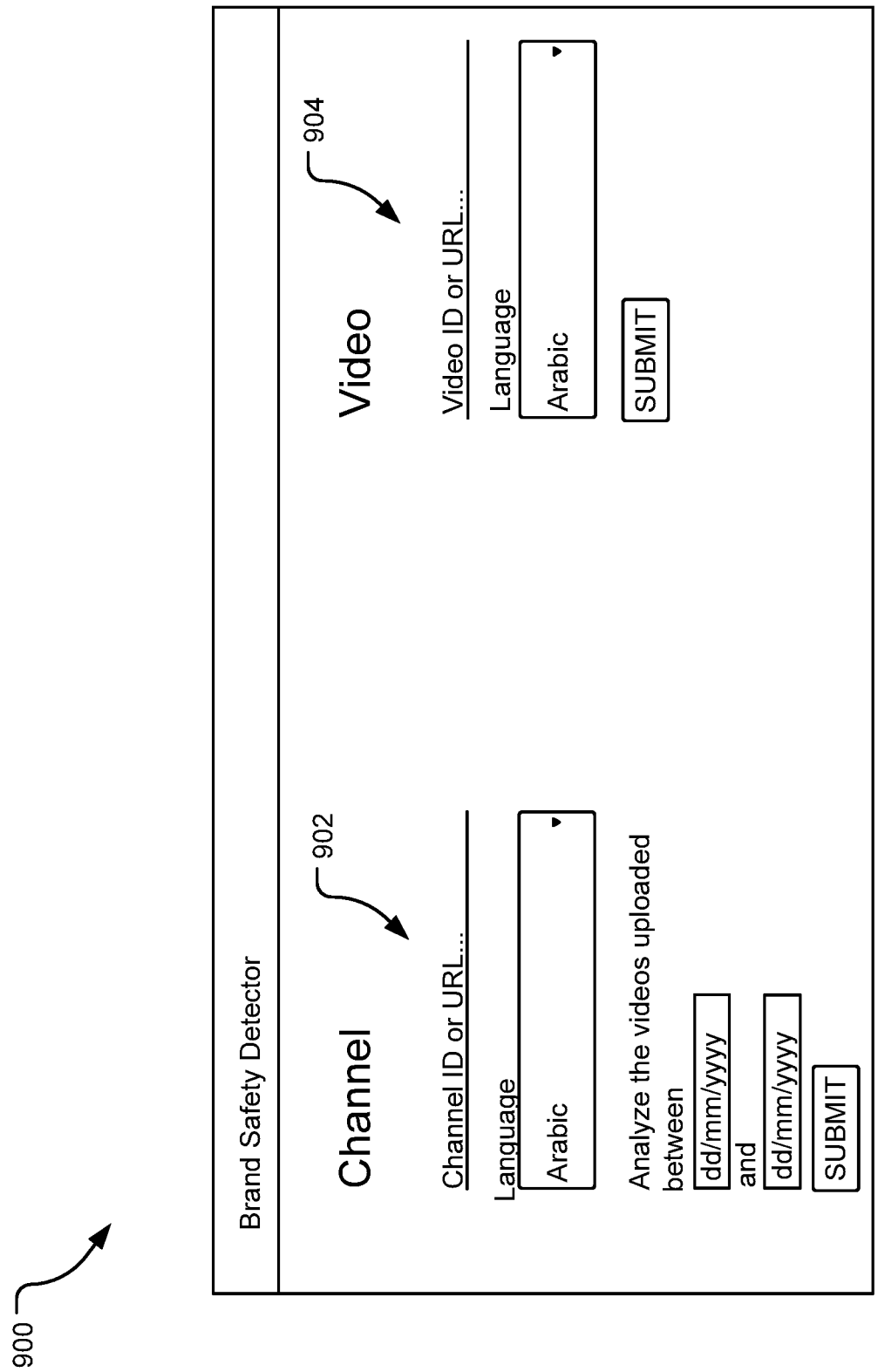
FIG. 9 illustrates an example user interface for providing inputs to a sentiment prediction engine.

FIG. 9 illustrates an example user interface 900 for providing inputs to a sentiment prediction engine. The user interface 900 allows a user to input either channel information 902 or video information 904 (e.g., if the user wishes to evaluate user sentiments associated with an individual video rather than an entire channel). To supply the channel information 902, a user provides an identifier of digital content channels such as a User name, a user ID or URL to a digital media channel. The user ID may, for example, be a channel ID that is assigned to a channel by the content sharing service provider (e.g., YouTube). In one embodiment, the user can also specify the date range specifying a time period that allows the sentiment prediction engine to identify a subset of videos identified for the sentiment analysis. For example, an advertiser may specify a channel ID or URL of a channel under consideration for an advertising partnership. Rather than all the videos posted by the channel, the promotor can specify a recent date range, which is indicative of the type of content that the channel is currently producing. The sentiment prediction engine intelligently calculates the sentiment risk associated with the videos uploaded to the channel of interest during that period.

In one embodiment, if the user (e.g., a promotor) is interested in predicting user sentiments associated with a particular individual video the user can specify the video information 904 such as a video ID or URL. The user sends the input to the sentiment prediction engine by selecting a submit button.

Figure 10:
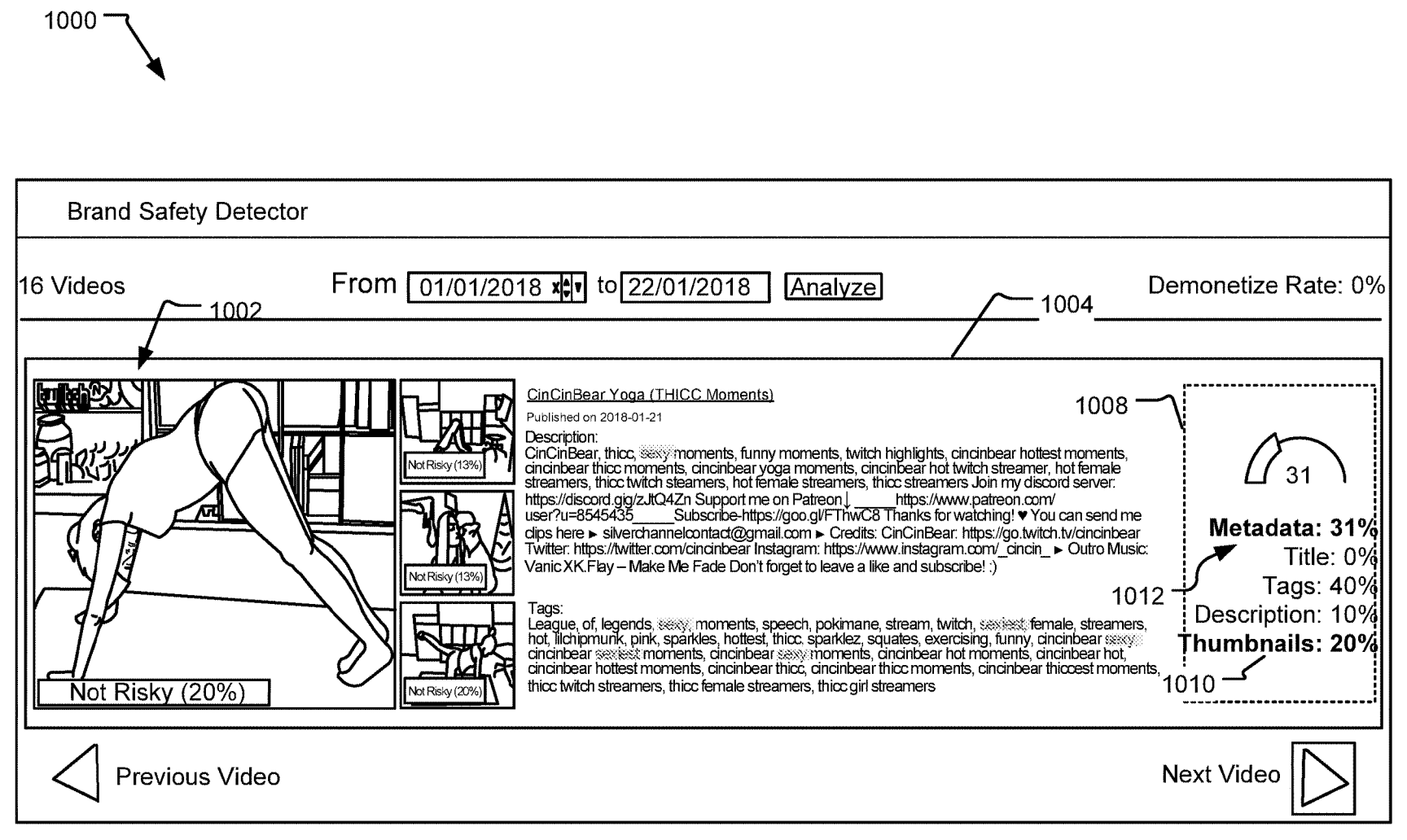

FIG. 10 illustrates example outputs of a sentiment prediction engine 1000. Here, the sentiment prediction engine has analyzed videos uploaded to a particular channel during a specified date range. The sentiment prediction engine identified 16 videos within the specified date range, analyzed each video, and output a video summary 1004 of the analysis for each one of the videos. For each video (e.g., video 1002), the outputs include analysis of selected images (frames) from the video that are associated with the highest visual risk metrics. In different implementations, different methods may be implemented for selecting the images or frames selected for analysis for a given content channel. In one implementation, image frames are chosen randomly. In another implementation, the frames can be chosen from certain time stamps such as 25%, 50% and 75% mark of the video. In one implementation, the selected images that are very similar to another selected image can be removed from the analysis to further improve the computational efficiency.

The video summary 1004 output by the sentiment prediction engine 1000 includes exemplary text extracted from the video or metadata of the video with the video that is identified as contributing to an increase in negative sentiment risk. A sentiment prediction 1008 for the video includes a textual risk metric 1012 (e.g., based on text of the video or extracted from the video metadata), as well as a visual risk metric 1010. Although other implementations are contemplated, the visual risk metric 1010 and the textual risk metric 1012 are, in FIG. 10, each presented as a percentage quantifying negative sentiment risk for the associated content (e.g., either the textual content or the visual content).

Figure 11:
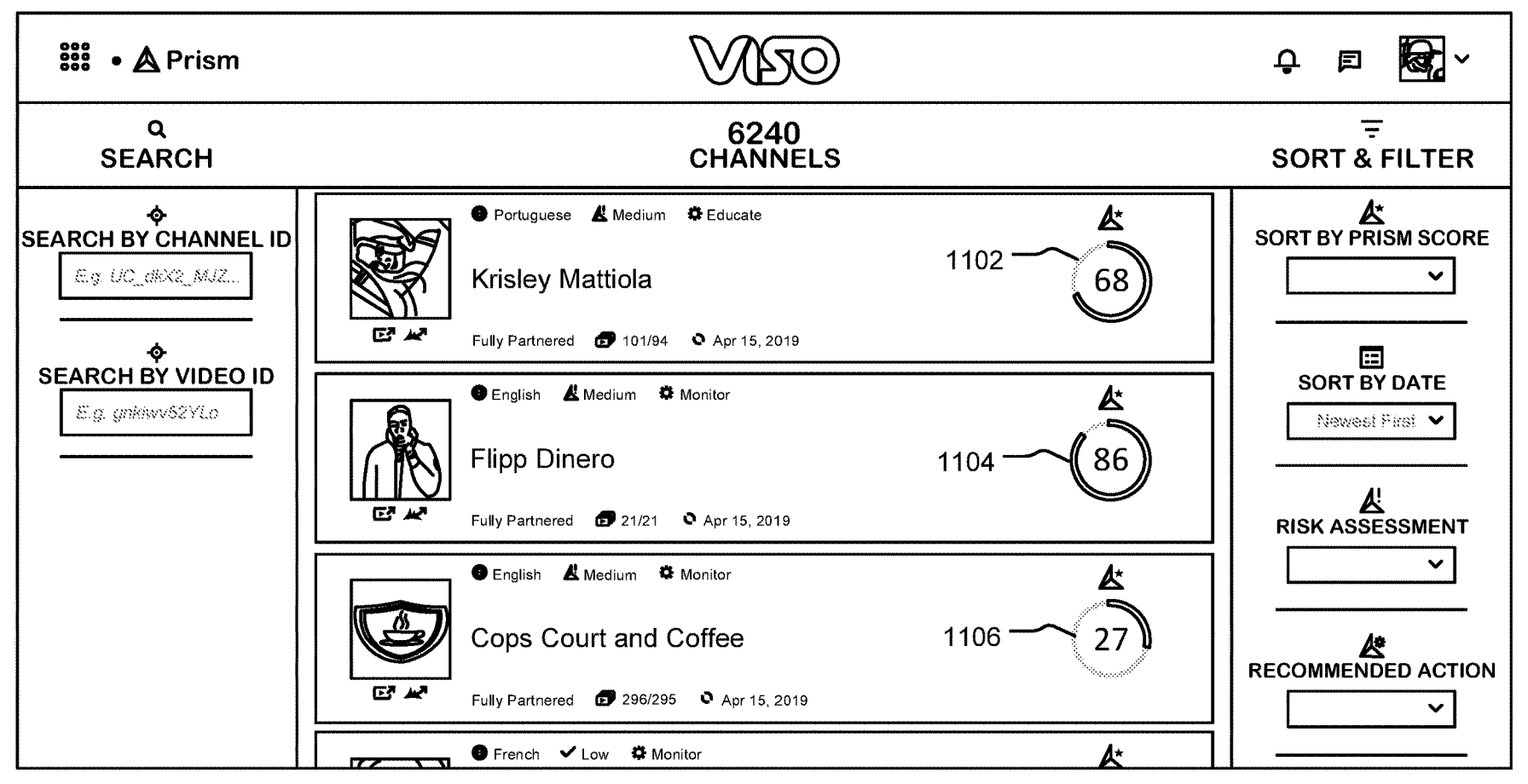

FIG. 11 illustrates example sentiment prediction metrics 1100 for different digital media content channels (e.g., channels named "Krisley Mattiola", "Flipp Dinero," and "Cops Court and Coffee"). For each channel, a sentiment prediction engine has output a corresponding sentiment prediction score (e.g., 1102, 1104, 1106) representing the risk of negative sentiment invoked by the channel as a whole. The exemplary sentiment prediction scores are numerical (e.g., a percentage with 100 representing a highest risk and 0 representing a lower risk), but may assume a variety of forms in other implementations. For example, the sentiment prediction score may for each channel may be represented as a label (e.g., "safe" or "unsafe"). In different implementations the exemplary sentiment prediction scores 1102, 1104, 1106 may be based on one or more computed sentiment indicators for the associated channels including without limitation a textual risk metric, visual risk metric, audio risk metric, and/or a channel risk metric (e.g., as described herein with respect to other implementations).

Figure 12:
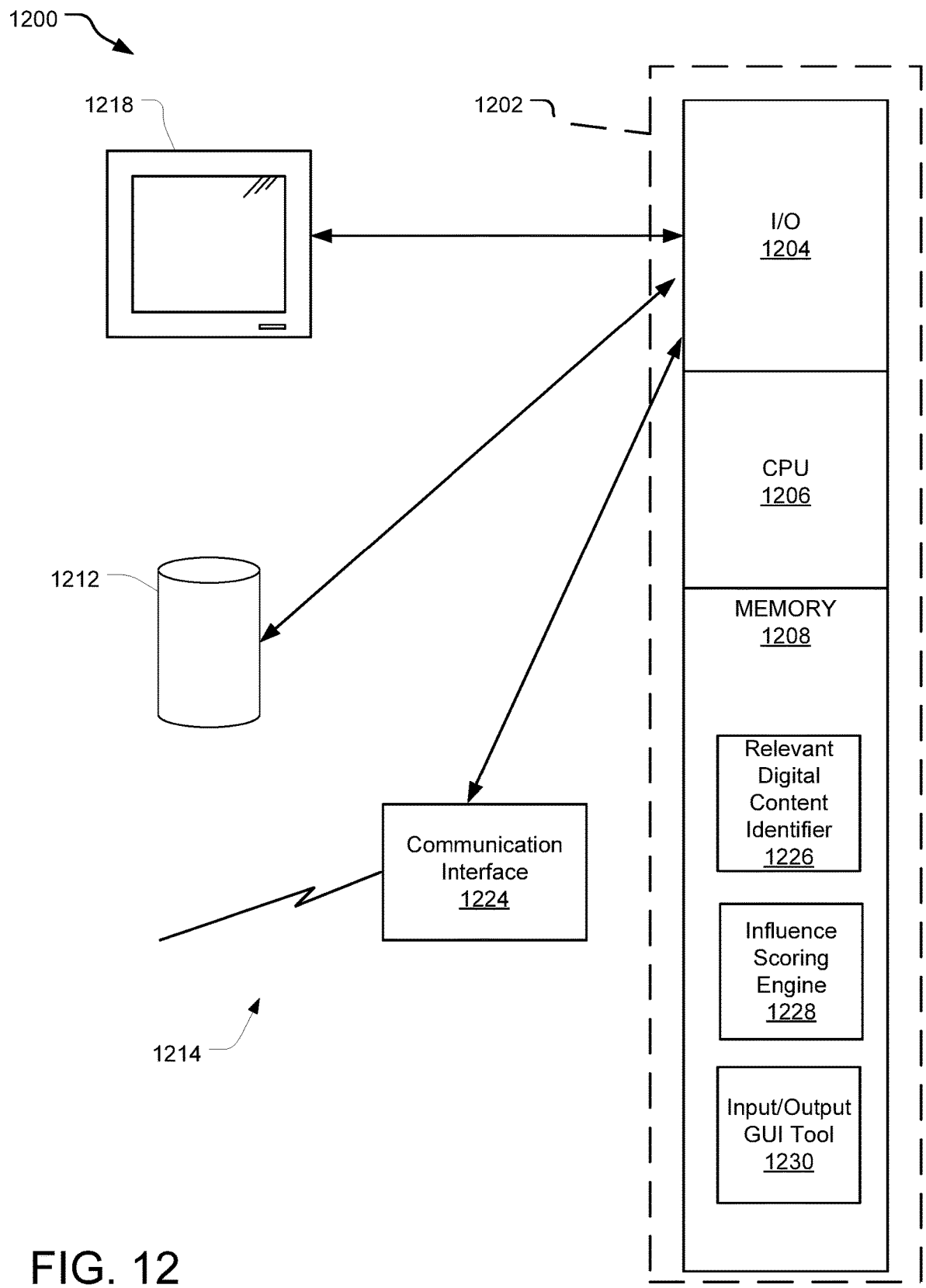
FIG. 12 discloses a block diagram of a computer system suitable for implementing one or more aspects of the disclosed technology.

FIG. 12 discloses a block diagram of a computer system 1200 suitable for implementing one or more aspects of the system for digital content search and market influence analysis. The computer system 1200 is capable of executing a computer program product embodied in a tangible computer-readable storage medium to execute a computer process. Data and program files may be input to the computer system 1200, which reads the files and executes the programs therein using one or more processors. Some of the elements of a computer system 1200 are shown in FIG. 12 wherein a processor 1202 is shown having an input/output (I/O) section 1204, a Central Processing Unit (CPU) 1206, a Graphics Processing Unit (GPU) and a memory section 1208. There may be one or more processors 1202, such that the processor 1202 of the computing system 1200 comprises a single central-processing unit 1206, or a plurality of processing units. The processors may be single core, dual-core or multi-core processors. The computing system 1200 may be a conventional computer, a distributed computer, a computer or group of computers as a part of a cloud computing service or any other type of computer. The described technology is optionally implemented in software loaded in memory 1208, a storage unit 1212, and/or communicated via a wired or wireless network link 1214 on a carrier signal (e.g., Ethernet, 3G wireless, 4G wireless, 5G wireless, LTE (Long Term Evolution)) thereby transforming the computing system 1200 in FIG. 12 to a special purpose machine for implementing the described operations.

The I/O section 1204 may be connected to one or more user-interface devices (e.g., a keyboard, a touch-screen display unit 518, etc.) or a storage unit 1212. Computer program products containing mechanisms to effectuate the systems and methods in accordance with the described technology may reside in the memory section 1208 or on the storage unit 1212 of such a computer system 1200.

A communication interface 1224 is capable of connecting the computer system 1200 (including handheld or tablet device) to a network via the network link 1214, through which the computer system can receive instructions and data embodied in a carrier wave. When used in local area networking (LAN) environment, the computer system 1200 is connected (by wired connection or wirelessly) to a local network through the communication interface 1224, which is one type of communications device. When used in a wide-area-networking (WAN) environment, the computer system 1200 typically includes a modem, a wired or unwired network, a network adapter, or any other type of communications device for establishing communications over the wide area network. In a networked environment, program modules depicted relative to the computer system 1200 or portions thereof, may be stored in a remote memory storage device. It is appreciated that the network connections shown are examples of communications devices for and other means of establishing a communications link between the computers may be used.

In an example implementation, a sentiment prediction engine (e.g., 102 of FIG. 1) includes one or more of a channel analysis engine (e.g., 138 of FIG. 1), a visual analysis engine (e.g., 128 of FIG. 1), and a text analysis engine (e.g., 118 of FIG. 1). The sentiment prediction engine is embodied by instructions stored in memory 1208 and/or the storage unit 1212 and executed by the processor 1202.

One or more relational or non-relational databases storing digital content metadata and/or digital content items searchable by the relevant digital content identifier may be stored in the disc storage unit 1212 or other storage locations accessible by the computer system 1200, such as across a wide area network (WAN) or a local area network (LAN) or a private cloud or a public cloud. In addition, the computer system 1200 may utilize a variety of tools to mine and process digital media content and related metadata such as one or more knowledge base systems accessible across a network and/or various database query tools, such as tools provided one or more digital media sharing websites. A sentiment prediction engine and/or any of its associated submodules (e.g., text analyzer, visual recognition and classification module) may be implemented using a general-purpose computer and specialized software (such as a server executing service software), a special purpose computing system and specialized software (such as a mobile device or network appliance executing service software), or other computing configurations. In addition, modules of a market influence analysis engine may be stored in the memory 1208 and/or the storage unit 1212 and executed by the processor 1202.

The implementations of the invention described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of predicting viewer sentiment invoked by a collection of digital content items accessible through a digital content channel, the method comprising:
assessing channel metadata associated with the collection of digital content items, the channel metadata including at least one of:
data indicating an association between the channel and one or more other channels;
channel history data for the channel; and
demographic information about the channel;
determining a channel risk metric for the digital content channel as a whole, the channel risk metric being based on the assessment of the channel metadata and quantifying a risk that content of the digital content channel is, as a whole, likely to invoke a strong or negative emotional reaction in viewers of the channel; and
rendering to a display a sentiment prediction based on the channel risk metric, the sentiment prediction being presented as a label descriptive of an overall negative sentiment risk for the channel as a whole.

2. The method of claim 1, wherein determining the channel risk metric further comprises:
providing the channel metadata to a machine learning classifier trained on a dataset comprising a channel metadata and a predetermined risk quantifier for each of multiple digital channels, the machine learning classifier configured to receive channel metadata for a source channel and output a channel metrics sentiment indicator qualifying a negative sentiment risk for the source channel.

3. The method of claim 1, wherein determining the channel risk metric further comprises:
computing a channel history sentiment indicator based on changes in a quantity of content accessible through the digital content channel, wherein a net increase in the quantity of content accessible through the digital content channel is associated with a lower negative sentiment risk than a sentiment score associated with a net decrease in the quantity of content accessible through the digital content channel.

4. The method of claim 1, wherein determining the channel risk metric further comprises:
computing a channel history sentiment indicator based on a viewing statistic for the digital content channel, the viewing statistic quantifying changes in viewing time for the digital content channel, wherein a net decrease in viewing time is associated with a higher negative sentiment risk than a sentiment score associated with a net increase in the viewing time.

5. The method of claim 1, wherein determining the channel risk metric further comprises:
computing a channel association sentiment indicator based on a channel status for each of multiple other digital content channels managed by users subscribed to the digital content channel, the channel association sentiment indicator being indicative of a greater negative sentiment risk when a larger proportion of the other digital content channels are disabled than when a smaller proportion of the other user channels are disabled.

6. The method of claim 1, wherein the sentiment prediction is further based on a visual risk metric quantifying negative sentiment risk associated with visual content of the digital content channel and a textual risk metric quantifying a negative sentiment risk associated with textual content of the digital content channel.

7. The method of claim 1, wherein the sentiment prediction is a quantifier defined in association with a predefined risk category.

8. A system for predicting viewer sentiment invoked by a collection of digital content items accessible through a digital content channel, the system comprising:
memory;
a processor;
a sentiment prediction engine stored in the memory and executable by the processor to:
assess channel metadata associated with the collection of digital content items to determine and render to a display a label including a channel risk metric that quantifies, a risk that content of the digital content channel is, as a whole, likely to invoke a strong or negative emotional reaction in viewers of the channel, the channel metadata including at least one of:
data defining an association between the channel and one or more other channels;
channel history data for the channel; and
demographic information about the channel.

9. The system of claim 8, wherein the sentiment prediction engine renders the channel risk metric utilizing a machine learning classifier trained on a dataset comprising a channel metadata and a predetermined risk quantifier for each of multiple digital channels, the machine learning classifier configured to receive channel metadata for a source channel and output a channel metrics sentiment indicator qualifying a negative sentiment risk for the source channel.

10. The system of claim 8, wherein the sentiment prediction engine renders the channel risk metric by computing a channel history sentiment indicator based on changes in a quantity of content accessible through the digital content channel over time, wherein a net increase in the quantity of content accessible through the digital content channel is associated with a lower negative sentiment risk than a sentiment score associated with a net decrease in the quantity of content accessible through the digital content channel.

11. The system of claim 8, wherein the sentiment prediction engine renders the channel risk metric by computing a channel history sentiment indicator based on a viewing statistic for the digital content channel, the viewing statistic quantifying changes in viewing time for the digital content channel, wherein a net decrease in the viewing time is associated with a higher negative sentiment risk than a sentiment score associated with a net increase in the viewing time.

12. The system of claim 8, wherein the sentiment prediction engine renders the channel risk metric by computing a channel association sentiment indicator based on a channel status for each of multiple other digital content channels managed by users subscribed to the digital content channel, the channel association sentiment indicator being indicative of a greater negative sentiment risk when a larger proportion of the other digital content channels are disabled than when a smaller proportion of the other user channels are disabled.

13. The system of claim 8, wherein the sentiment prediction engine further renders the channel risk metric based on at least one of a visual risk metric quantifying negative sentiment risk associated with visual content of the digital content channel and a textual risk metric quantifying a negative sentiment risk associated with textual content of the digital content channel and an audio risk metric quantifying negative sentiment risk associated with audio content of the digital content channel.

14. The system of claim 8, wherein the sentiment prediction is a quantifier defined in association with a predefined risk category.

15. One or more memory devices encoding computer-executable instructions for executing a computer process for predicting viewer sentiment invoked by a collection of digital content items accessible through a digital content channel, the computer process comprising:
  assessing channel metadata associated with the collection of digital content items, the channel metadata including at least one of:
  data defining an association between the channel and one or more other channels;
  channel history data for the channel; and
  demographic information about the channel;
  determining a channel risk metric for the digital content channel as a whole, the channel risk metric being based on the assessment of the channel metadata and quantifying a risk that content of the digital content channel is, as a whole, likely to invoke a strong or negative emotional reaction in viewers of the channel; and
  rendering to a display a sentiment prediction based on the channel risk metric, the sentiment prediction being presented as a label descriptive of an overall negative sentiment risk for the channel as a whole.

16. The one or more memory devices of claim 15, wherein determining the channel risk metric further comprises:
  providing the channel metadata to a machine learning classifier trained on a dataset comprising a channel metadata and a predetermined risk quantifier for each of multiple digital channels, the machine learning classifier configured to receive channel metadata for a source channel and output a channel metrics sentiment indicator qualifying a negative sentiment risk for the source channel.

17. The one or more memory devices of claim 15, wherein determining the channel risk metric further comprises:
  computing a channel history sentiment indicator based on changes in a quantity of content accessible through the digital content channel, wherein a net increase in the quantity of content accessible through the digital content channel is associated with a lower negative sentiment risk than a sentiment score associated with a net decrease in the quantity of content accessible through the digital content channel.

18. The one or more memory devices of claim 15, wherein determining the channel risk metric further comprises:
  computing a channel history sentiment indicator based on a viewing statistic for the digital content channel, the viewing statistic quantifying changes in viewing time for the digital content channel, wherein a net decrease in the viewing time is associated with a higher negative sentiment risk than a sentiment score associated with a net increase in the viewing time.

19. The one or more memory devices of claim 15, wherein determining the channel risk metric further comprises:
  computing a channel association sentiment indicator based on a channel status for each of multiple other digital content channels managed by users subscribed to the digital content channel, the channel association sentiment indicator being indicative of a greater negative sentiment risk when a larger proportion of the other digital content channels are disabled than when a smaller proportion of the other user channels are disabled.

20. The one or more memory devices of claim 15, wherein the sentiment prediction is further based on a visual risk metric quantifying negative sentiment risk associated with visual content of the digital content channel and a textual risk metric quantifying a negative sentiment risk associated with textual content of the digital content channel.

* * * * *